(12) United States Patent
Vaidya et al.

(10) Patent No.: US 12,017,180 B2
(45) Date of Patent: Jun. 25, 2024

(54) IMPROVING SULFUR RECOVERY OPERATIONS WITH PROCESSES BASED ON NOVEL $CO_2$ OVER $SO_2$ SELECTIVE MEMBRANES AND ITS COMBINATIONS WITH $SO_2$ OVER $CO_2$ SELECTIVE MEMBRANES

(71) Applicants: Saudi Arabian Oil Company, Dhahran (SA); Membrane Technology and Research, Inc, Newark, CA (US)

(72) Inventors: Milind Vaidya, Dhahran (SA); Sebastien Duval, Dhahran (SA); Feras Hamad, Dhahran (SA); Richard Baker, Newark, CA (US); Tim Merkel, Newark, CA (US); Kaaeid Lokhandwala, Newark, CA (US); Ahmad Bahamdan, Dhahran (SA); Faisal Al-Otaibi, Dhahran (SA)

(73) Assignees: Saudi Arabian Oil Company, Dhahran (SA); Membrane Technology and Research, Inc., Newark, CA (US)

( * ) Notice: Subject to any disclaimer, the term of this patent is extended or adjusted under 35 U.S.C. 154(b) by 500 days.

(21) Appl. No.: 17/357,567

(22) Filed: Jun. 24, 2021

(65) Prior Publication Data

US 2023/0001349 A1 Jan. 5, 2023

(51) Int. Cl.
*B01D 53/22* (2006.01)
*B01D 71/24* (2006.01)
(Continued)

(52) U.S. Cl.
CPC ........... *B01D 53/226* (2013.01); *B01D 71/24* (2013.01); *B01D 71/32* (2013.01); *C01B 17/508* (2013.01); *C01B 17/56* (2013.01)

(58) Field of Classification Search
CPC ....... C01B 17/508; C01B 17/56; B01D 71/32; B01D 53/226; B01D 71/24
See application file for complete search history.

(56) References Cited

U.S. PATENT DOCUMENTS

| 3,199,955 A | 8/1965 | West et al. |
| 3,503,186 A | 3/1970 | Ward |

(Continued)

FOREIGN PATENT DOCUMENTS

| CN | 102989268 B | 11/2015 |
| CN | 107138026 B | 3/2020 |
| WO | 2018169903 A1 | 9/2018 |

OTHER PUBLICATIONS

Fang et al., "High-Performance Perfluorodioxolane Copolymer Membranes for Gas Separation with Tailored Selectivity Enhancement", Mater. Chem. A, 2018, 6, 652-658.

(Continued)

*Primary Examiner* — Anthony R Shumate
(74) *Attorney, Agent, or Firm* — Bracewell LLP; Constance G. Rhebergen; Eleanor T. Porter

(57) ABSTRACT

Methods and systems for recovering sulfur dioxide from a Claus unit process emissions stream are provided. The method comprises the steps of generating a process emissions stream from a thermal oxidizer or other combustion device, introducing the emissions stream to an $SO_2$ removal system, introducing the $SO_2$ rich stream from the $SO_2$ removal system to a $CO_2$ removal system, and introducing an enriched $SO_2$ stream back to the Claus unit. The $SO_2$ removal system can include one or more $SO_2$ selective membranes. The $CO_2$ removal system can include one or more $CO_2$ selective membranes.

37 Claims, 12 Drawing Sheets

(51) Int. Cl.
  *B01D 71/32*   (2006.01)
  *C01B 17/50*   (2006.01)
  *C01B 17/56*   (2006.01)

(56) References Cited

U.S. PATENT DOCUMENTS

| | | | |
|---|---|---|---|
| 3,928,547 A | 12/1975 | Daley et al. | |
| 4,039,650 A | 8/1977 | Daley | |
| 4,117,100 A | 9/1978 | Hellmer et al. | |
| 5,256,296 A * | 10/1993 | Baker | B01D 53/226 96/10 |
| 5,407,466 A * | 4/1995 | Lokhandwala | B01D 71/80 95/52 |
| 6,085,549 A * | 7/2000 | Daus | B01D 53/226 62/922 |
| 8,206,669 B2 | 6/2012 | Schaffer et al. | |
| 9,943,802 B1 * | 4/2018 | Ballaguet | B01D 53/22 |
| 9,994,452 B2 | 6/2018 | Weiss et al. | |
| 10,106,410 B2 | 10/2018 | Ballaguet et al. | |
| 10,106,411 B2 | 10/2018 | Ballaguet et al. | |
| 10,589,223 B1 * | 3/2020 | Raynel | C01B 17/05 |
| 11,638,898 B1 * | 5/2023 | Hamad | B01D 53/75 423/224 |
| 2011/0033370 A1 | 2/2011 | Ayala et al. | |
| 2011/0094379 A1 * | 4/2011 | Cordatos | B01D 67/0079 96/11 |
| 2012/0055385 A1 | 3/2012 | Lien et al. | |
| 2013/0098246 A1 * | 4/2013 | Lee | B01D 53/229 96/9 |
| 2016/0256818 A1 * | 9/2016 | Gerber | F01K 5/00 |
| 2018/0257936 A1 | 9/2018 | Ballaguet et al. | |
| 2019/0010052 A1 | 1/2019 | Ballaguet et al. | |
| 2019/0016598 A1 | 1/2019 | Ballaguet et al. | |
| 2020/0360853 A1 * | 11/2020 | Vaidya | C01B 17/508 |
| 2020/0360854 A1 * | 11/2020 | Vaidya | B01D 53/1443 |
| 2020/0360855 A1 * | 11/2020 | Vaidya | B01D 53/1468 |
| 2022/0380693 A1 * | 12/2022 | Vaidya | B01D 71/52 |

OTHER PUBLICATIONS

General Electric, "Immobilized Liquid Membranes for Sulfur Dioxide Separation", Research and Development Center, Final Report, Contract No. PH-86-68-76, S-70-1053, Cincinnati, Ohio, Mar. 1970, 15 pages.

Google English Translation of CN102989268B, publication date of Nov. 24, 2015, 7 pages.

Google English Translation of CN107138026A, Publication Date of Mar. 31, 2020, 5 pages.

Huang et al., "Facilitated Separation of CO2 and SO2 through Supported Liquid Membranes using Carboxylate-based Ionic Liquids", Journal of Membrane Science, vol. 471, Dec. 1, 2014, pp. 227-236.

Kim et al., "Separation Performance of PEBAX PEI Hollow Fiber Composite Membrane for SO2 CO2 N2 Mixed Gas", Chemical Engineering, Journal 233, 2013, pp. 242-250.

Kuehne et al., "Selective Transport of Sulfur Dioxide through Polymer Membranes. Polyacrylate and Cellulose Triacetate Single-Layer Membranes", 5. Ind. Eng. Chem. Process Des. Dev., 1980, 19 (4), pp. 609-616.

Perry et al., "Better Acid Gas Enrichment", Flexsorb Solvents, Suplphur 326, Jan.-Feb. 2010, pp. 38-42.

Ren et al., "Poly(amide-6-b-ethylene oxide) Membranes for Sour Gas Separation", Separation and Purification Technology 89, 2012, pp. 1-8.

Toy et al, "CO2 Capture Membrane Process for Power Plant Flue Gas", Final Technical Report, DOE Cooperative Agreement No. DE-NT0005313, RTI International, Research Triangle Park, NC, Apr. 2012, 76 pages.

Yingying et al., "Permeability and Selectivity of Sulfur Dioxide and Carbon Dioxide in Supported Ionic Liquid Membranes", Chinese Journal of Chemical Engineering, 17(4), 2009, pp. 594-601.

SA5122431200 First Examination Report dated Jan. 13, 2024, 15 pgs.

* cited by examiner

IMPROVING SULFUR RECOVERY OPERATIONS WITH PROCESSES BASED ON NOVEL $CO_2$ OVER $SO_2$ SELECTIVE MEMBRANES AND ITS COMBINATIONS WITH $SO_2$ OVER $CO_2$ SELECTIVE MEMBRANES

NAMES OF THE PARTIES TO A JOINT RESEARCH AGREEMENT

This disclosure relates to a joint research agreement between Membrane Technology and Research, Inc., formed under the laws of the State of California, USA, having an address at 39630 Eureka Drive, Newark, CA, 94560; and Saudi Aramco Technologies Company, a limited liability company organized under the law of the Kingdom of Saudi Arabia, whose principal office is located in Dhahran, Saudi Arabia.

FIELD

This disclosure relates to methods and systems for gas separation membrane processes for the improvement of a sulfur recovery operation. More specifically, this disclosure relates to $SO_2$ removal on the emissions streams from a sulfur recovery operation using a $CO_2$ selective membrane and $SO_2$ selective membrane.

BACKGROUND

As part of natural gas processing and hydro-treatment of oil fractions, a large amount of hydrogen sulfide ($H_2S$) is produced. The conversion of $H_2S$ into elemental sulfur (S) is performed in a sulfur recovery unit (SRU). A need often exists to minimize the amount of sulfur compounds released to atmosphere from the recovery unit to meet mandated legal limits. The most common process used in the world for this conversion is known as the modified Claus treatment process or alternately the Claus unit or modified Claus unit. The modified Claus treatment process is a combination of thermal and catalytic processes that are used for converting gaseous $H_2S$ into S.

Claus unit feed gases have a wide range of compositions. Feed gases can originate from absorption processes using various solvents (amine, physical or hybrid solvents) to extract $H_2S$ from the by-product gases of petroleum refining, natural gas processing, and other industries using sour water stripper units.

The first process of a Claus unit is a thermal process in a reaction furnace. The feed gas to the Claus unit is burned in the reaction furnace using sufficient combustion air, or oxygen enriched air to burn a stoichiometric one-third of the contained $H_2S$. The $H_2S$ from the feed gas is thermally converted into S, along with sulfur dioxide ($SO_2$). The reaction furnace operation is designed to maximize sulfur recovery in consideration of the feed composition, by adjusting air/oxygen feed, reaction temperature, pressure, additional fuel, and residence time. In addition, the reaction furnace can destroy contaminants, such as hydrocarbons, that are present in the feed gas stream. Such contaminants pose problems for the catalytic reactors through the development of carbon-sulfur compounds that can lead to plugging or deactivation of the catalyst beds. Maintaining proper reaction furnace temperatures is important to maintain effective Claus unit operations.

The hot reaction product gas from the reaction furnace containing sulfur vapor is used to produce high pressure steam in a waste heat boiler, which also results in cooling the gas. The product gas is then further cooled and condensed in a heat exchanger, while producing additional low pressure steam. The condensed liquid S is separated from the remaining unreacted gas in the outlet end of the condenser and sent to a sulfur pit or other collection area.

The separated gas then enters the catalytic process of the Claus unit. The catalytic process contains between two and three catalytic reactors. Following the sulfur condenser, the separated gas is reheated and enters the first catalytic reactor. In the first catalytic reaction some of the $H_2S$ in the feed gas is converted into S through a reaction with the $SO_2$. The outlet product gas from the first catalytic reactor is cooled in a second condenser. Again, the condensed liquid S is separated from the remaining unreacted gas in the outlet end of the second condenser and sent to sulfur storage. The separated gas from the second condenser is sent to another re-heater and the sequence of gas reheat, catalytic reaction, condensation and separation of liquid S from unreacted gas is repeated for the second and third catalytic reactors.

Finally, the gas stream is released to atmosphere via a stack after passing through an incinerator which oxidizes any remaining sulfur species into $SO_2$. In addition, the emissions stream compounds include water, nitrogen, oxygen, $SO_2$ and eventually carbon dioxide ($CO_2$).

For a well-designed and well-operated Claus sulfur recovery plant having three catalytic reactors, an overall sulfur conversion of 96-98% can be achieved depending on the feed gas composition. To achieve higher conversion, a tail gas treatment unit must be added to further process the exhaust gas upstream of or as an alternative to an incinerator. Currently available tail gas treatment units can be effective at achieving up to 99.9% recovery, but can add significant capital cost to the Claus treatment unit, often on the same order of magnitude as the Claus unit itself.

Several types of tail gas treatment unit (TGTU) technologies have been developed and include the Scot® process, Highsulf™, BSR/MDEA™, Sublimate™, Bechtel TGTU, and Technip TGTU. The choice of tail gas treatment unit installed depends on the conversion target as cost is directly linked to the required conversion level. While the Scot process can reach 99.9% sulfur recovery, the added cost and unit complexity makes this process unfeasible when the Claus feed is not highly concentrated. In addition to increased operating and capital costs, these technologies can require a significant physical footprint for the various process vessels, columns, pumps, and storage vessels necessary for operation.

Additionally, processes can be added as an alternative to tail gas treatment units to target $SO_2$ for removal and reduce sulfur oxide emissions from combusted gas streams. The techniques are generally divided into regenerative processes and non-regenerative processes and can be further divided into wet processes and dry processes.

Non-regenerative processes include a variety of wet-scrubbing processes, such as spray towers and limestone-gypsum processes, and are the leading technologies when high efficiency $SO_2$ removal is targeted at relatively low cost. In a limestone-gypsum process, flue gas enters an absorber tower and bubbles through a spray of limestone and water, where the $SO_2$ reacts with the lime to create calcium sulfite, which reacts with oxygen to produce gypsum, which can then be disposed. The unreacted gases then exit the top of the tower.

For regenerative processes, sorbent is reused after thermal or chemical treatment to produce concentrated $SO_2$, which is usually converted to elemental sulfur. These are complex processes requiring high capital outlays and include the magnesium oxide process and Wellman-Lord process. On the dry process side, regenerative processes include activated carbon.

Regenerative processes can also utilize solvent technologies. Examples of such technologies include LAB-SORB™, CANSOLV®, ClausMaster™, and Clintox®. In most cases, flue gas is not saturated. However, before acid gases such as $SO_2$ can be removed, the gas stream must be adiabatically saturated or "quenched." Scrubbers can have a section where liquid (typically water or a scrubbing reagent) is contacted with the flue gas to "quench" the gas stream.

The LAB-SORB™ process utilizes an inorganic regenerable scrubbing reagent to react with $SO_2$. The reagent, rich in $SO_2$ from the scrubber, is processed in a regeneration unit to strip off the captured $SO_2$, producing fresh reagent for scrubbing. The $SO_2$ removed from the reagent is discharged as concentrated $SO_2$ (90+%) and can be sent to the front end of a Claus plant (or sulfuric acid plant) for recovery. Solids are removed from the flue gas in a pre-scrubbing section and de-watered in a system similar to what is used in the purge treatment unit of caustic soda based FCCU scrubbing system. Caustic soda (NaOH) and phosphoric acid ($H_3PO_4$) are used for the buffer. Low pressure steam is used for buffer regeneration in single or double effects evaporation loop. The LAB-SORB™ process produces a minimum amount of waste for disposal, while recovered $SO_2$ can be converted to saleable products.

The CANSOLV® system is similar to the amine treatment process for removal of $H_2S$ and $CO_2$ from refinery streams and natural gas. The gas is contacted counter currently in the absorption tower, where the CANSOLV® solvent absorbs the sulfur dioxide, reducing the effluent gas down to the design $SO_2$ concentration. The rich amine accumulates in the absorption sump. A constant stream of the CANSOLV® solvent (based on a sterically hindered diamine) is withdrawn from the absorption sump to be regenerated in the stripping tower. Once regenerated, the solvent is recirculated to the absorption tower to pick up additional $SO_2$. Emissions as low as 10 ppmV can be achieved.

In the CLAUSMASTER® process hot $SO_2$ gas is cooled by a DynaWave® wet scrubber and gas cooling tower. $SO_2$ removal occurs after the $SO_2$ gas has been quenched in two steps. The acid gases are absorbed into the scrubbing liquid and react with the reagent, forming reaction by-products, which then are removed from the clean gas. After passing through the proprietary $SO_2$ physical absorbent, clean gas exits the stack and the $SO_2$ is stripped from the $SO_2$ loaded absorbent in the stripping tower. Concentrated $SO_2$ is recycled back to the Claus sulfur recovery plant. The recycled $SO_2$ reduces the air and fuel requirements for a typical Claus plant and $H_2S$ tail gas system. This process is not prevalent in refineries or gas plants as it adds complexity. This process is used for smelters where concentrated $SO_2$ is directed to $H_2SO_4$ production as this chemical is being used in the metal manufacturing process.

The CLINTOX® and SOLINOX® process is a physical scrubber process. The completely oxidized tail gas containing only $SO_2$ is fed to a physical scrubbing tower. The concentrated $SO_2$ is stripped from the solvent in a second column and sent back to the Claus inlet. In the CLINTOX® process, the residual $SO_2$ in the flue is constant because of the higher solubility of $SO_2$ in the scrubbing solution. This self-regulation allows the Claus plant to be less sophisticated and therefore, less expensive. High sulfur recovery rates are attainable with approximately 80 ppmV residual $SO_2$ in the exhaust gas.

Another type of scrubbing system is using caustic/sodium sulfite solution to capture $SO_2$ from catalytically oxidized sulfur species. Such a system processes lean acid gas over a catalyst which oxidizes the $H_2S$ to $SO_2$ at a temperature of about 700° F. This is desirable for low $SO_2$ emissions as produced sodium sulfite has to be disposed in the waste water system.

Regardless of which scrubbing technology is selected, one downside of scrubbers is that they all must have a method for removing the water droplets and reaction by-products from the gas before they exit the scrubber. When combined with the conventional Claus process, these processes increase the complexity of the system by requiring additional equipment and materials. In addition, the processes and systems require increases in energy use. All of these processes produce waste streams that require removal and processing. In addition, the processes need to provide removal of particulates in addition to acid gas removal. Most wet gas scrubbers will remove some particulates; however, another piece of equipment, such as a venturi scrubber, is often required to accomplish significant removal of particulates.

Therefore, a process which minimizes $SO_2$ being released to atmosphere without requiring excessive amounts of energy, equipment and materials, or process shutdown is desired. Preferably, such a process would maintain the overall sulfur capacity of the Claus unit, while increasing the overall sulfur recovery efficiency. Due to the large amount of $CO_2$ present in the tail gas of $SO_2$ emissions streams, recycling the streams directly can cause upsets in the Claus treatment units. A more efficient and less disruptive way of recycling tail gas and $SO_2$ emissions streams and separating components in the streams is needed. However, the presence of $CO_2$ in the tail gas streams can results in complications with separation.

Membranes can be used for separation of components in gas streams. Current membranes have difficulty in separating $CO_2$ from $SO_2$ containing streams. There are many different types of membranes, including porous membranes and dense polymer membranes. The various types of membranes operate via different methods. Dense polymer membranes operate through solution diffusion mechanisms. Gas transport through dense polymer membranes is governed by the expression:

$$J_i = \frac{D_i K_i^G (p_{io} p_{i\ell})}{\ell}$$

where $J_i$ is the flux of component i (g/cm²·s), $p_{io}$ and $p_{i\ell}$ are the partial pressures of the component i on either side of the membrane, $\ell$ is the membrane thickness, $D_i$ is the permeate diffusion coefficient and $K_i^G$ is the Henry's Law sorption coefficient (g/cm³·pressure). In gas permeation it is much easier to measure the volume flux through the membrane than the mass flux, so the equation is commonly rewritten as:

$$J_i = \frac{D_i K_i (p_{io} - p_{i\ell})}{\ell}$$

where $J_i$ is the volume (molar) flux expressed as (cm³(STP) of component i)/cm²·s) and $K_i$ is a sorption coefficient with units (cm³(STP) of component i)/cm³ of polymer·pressure). The product $D_i K_i$ can be written as '$P_i$ which is the membrane permeability, and is a measure of the membrane's ability to permeate gas, normalized for pressure driving force and membrane thickness. Permeability can be expressed as the product $D_i K_i$. The diffusion coefficient $D_i$ reflects the mobility of the individual molecules in the membrane material; the gas sorption coefficient $K_i$ reflects the number of molecules dissolved in the membrane material.

The term $j_i/(p_{io}-p_i\ell)$ commonly referred to as the permeance or pressure normalized flux is commonly measured in terms of gas permeation unit (gpu), where 1 gpu is defined as $10^{-6}$ cm$^3$(STP)·cm/cm$^2$·s cmHg, which is also 1 Barrer/micron.

Membranes may be able to selectively transfer some compounds through the membrane over other compounds. Membrane selectivity is the measure of the ability of a membrane to separate two gases, and is a unitless value calculated as the ratio of the gases' permeabilities through the membrane. Membrane selectivity is calculated by the following equation:

$$\alpha_{ij} = \frac{P_i}{P_j}$$

Where $\alpha_{i,j}$ is the membrane selectivity, $P_i$ is the permeability of gas i, and $P_j$ is the permeability of gas j. The permeability of gases is commonly measured in Barrer, or $10^{-10}$ cm$^3$ (STP) cm/cm$^2$·s cmHg.

The membrane selectivity equation can be rewritten as $$\alpha_{ij} = \left[\frac{D_i}{D_j}\right]\left[\frac{K_i}{K_j}\right]$$

The ratio $D_i/D_j$ is the ratio of the diffusion coefficients of the two gases and is commonly viewed as the mobility selectivity, reflecting the different sizes of the two molecules of the components i and j. The ratio $K_i/K_j$ is the ratio of the solubility coefficients of the two gases and is commonly viewed as the sorption or solubility selectivity, reflecting the relative solubilities of the two gases.

Thus far current membranes have been unable to effectively and efficiently separate $CO_2$ and $SO_2$ from tail gas streams. Additionally, current membranes removing $SO_2$ can often result in the addition of $CO_2$ to the permeate stream and a removal of $O_2$ from the permeate side to the retentate side of the membrane. When the $SO_2$ rich permeate is recycled to the Claus unit for sulfur removal, the delicate balance of the Claus unit can be disrupted due to the addition of $CO_2$, which provides no heating value, and the removal of $O_2$, which is necessary for the reactions. Therefore, a need exists to develop membrane systems and methods of use to generate a more concentrated $SO_2$ stream by reducing the percentage of $CO_2$ in the recycle to the Claus SRU furnace and reduce emissions while improving sulfur recovery through the Claus units.

SUMMARY

This disclosure relates to methods and systems for gas separation membrane processes for the improvement of a sulfur recovery operation. More specifically, this disclosure relates to $SO_2$ removal on the emissions streams from a sulfur recovery operation using a $CO_2$ selective membrane and $SO_2$ selective membrane.

In a first aspect, a method for processing sulfur dioxide emissions from a sulfur removal unit for improved operating conditions when treated streams are recycled to the sulfur removal unit is provided. The method includes the step of introducing an SO2 emissions stream to an SO2 removal system, where the SO2 removal system comprising an SO2 selective membrane operable to separate sulfur dioxide and carbon dioxide, and where the SO2 emissions stream is saturated with water and further includes sulfur dioxide and carbon dioxide. The method also includes the steps of separating sulfur dioxide and carbon dioxide in the SO2 removal system by the SO2 selective membrane, generating a CO2 removal system feed stream from the SO2 removal system, and generating a low SO2 discharge stream from the SO2 removal system. The method also include the step of introducing the CO2 removal system feed stream to a CO2 removal system, the CO2 removal system including a CO2 selective membrane operable to separate carbon dioxide and sulfur dioxide. The method further includes the step of separating carbon dioxide and sulfur dioxide in the CO2 removal system by the CO2 selective membrane, and generating an SO2 rich recycle derived from the CO2 removal system, so that the SO2 rich recycle has a higher concentration of sulfur dioxide than then SO2 emissions stream and so that the SO2 rich recycle has a lower concentration of carbon dioxide than the SO2 emissions stream. The method also includes generating a CO2 waste gas from the CO2 removal system.

In some embodiments, the method includes the step of recycling the SO2 rich recycle to the sulfur removal unit, so that the introduction of the SO2 rich recycle to the sulfur removal unit allows for additional sulfur recovery while assisting in maintaining a proper temperature profile in the sulfur removal unit due to the lower concentration of carbon dioxide in the SO2 rich recycle, and further so that an amount of a fuel gas introduced to the sulfur removal unit is reduced. In some embodiments, the SO2 emissions stream is generated from a combustion device in the sulfur removal unit. The sulfur removal unit is selected from the group consisting of a Claus plant, a sulfur scrubber, a metallurgical smelting process, a FCC catalyst regeneration process, and combinations of the same. In some embodiments, the low SO2 discharge stream includes less than 150 ppm sulfur dioxide. In other embodiments, the low SO2 discharge stream includes less than 100 ppm sulfur dioxide.

In some embodiments, the SO2 removal system includes a rubbery polar membrane. The CO2 selective membrane includes a perfluoropolymer. The perfluoropolymer is a monomer, copolymer, block copolymer, terpolymer, or block terpolymer generated by a combination of monomers selected from the group of monomers: CYTOP™ polymer material; HYFLON™ polymer material; TEFLON™ polymer; TEFLON™ polymer AF2400; TEFLON™ polymer AF1400; TEFLON™ polymer AD60; TEFLON™ polymer AD80; perfluoro(2-methylene-4,5-dimethyl-1,3-dioxolane); perfluoro(2-methylene-1,3-dioxolane); perfluoro-2,2-dimethyl-1,3-dioxole (PDD); and perfluoro-3-butenyl-vinyl ether (PBVE). In some embodiments, the perfluoropolymer is a homopolymer, a copolymer, a block copolymer, a terpolymer, a block terpolymer, or any other combination of the monomers selected from the group of monomers consisting of the following structures:

A 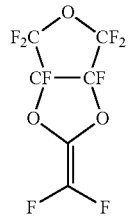

B 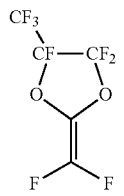

C 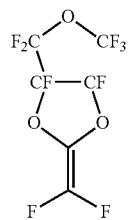

D 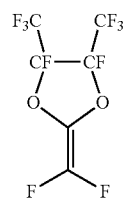

E 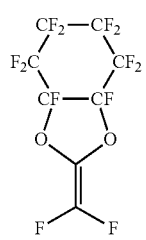

F 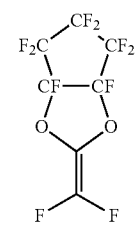

G 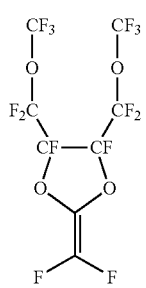

H 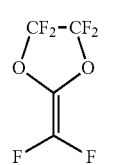

and combinations of the same.

In some embodiments, the SO2 removal system includes an SO2 selective membrane unit, the SO2 selective membrane unit including an SO2 selective membrane unit retentate side and an SO2 selective membrane unit permeate side, and the CO2 removal system includes a CO2 selective membrane unit, the CO2 selective membrane unit including a CO2 selective membrane unit retentate side and a CO2 selective membrane unit permeate side. The method further includes the steps of introducing the SO2 emissions stream to the SO2 selective membrane unit retentate side, the SO2 selective membrane unit operable to allow sulfur dioxide to permeate the SO2 selective membrane in preference to carbon dioxide; causing sulfur dioxide to pass through the SO2 selective membrane in the SO2 selective membrane unit to produce the CO2 removal system feed stream from the SO2 selective membrane unit permeate side; removing the low SO2 discharge stream from the SO2 selective membrane unit retentate side; introducing the CO2 removal system feed stream to the CO2 selective membrane unit retentate side, the CO2 selective membrane unit operable to allow carbon dioxide to permeate the CO2 selective membrane in preference to sulfur dioxide; causing the carbon dioxide to pass through the CO2 selective membrane in the CO2 selective membrane unit to produce the CO2 waste gas from the CO2 selective membrane unit permeate side; and removing the SO2 rich recycle from the CO2 selective membrane unit retentate side. In some embodiments, the method also includes the step of recycling the CO2 waste gas to the SO2 selective membrane unit retentate side, so that additional sulfur dioxide is recovered in the SO2 rich recycle.

The method also includes the step of recycling the SO2 rich recycle to the sulfur removal unit, so that the introduction of the SO2 rich recycle to the sulfur removal unit allows for additional sulfur recovery while assisting in maintaining a proper temperature profile in the sulfur removal unit due to the lower concentration of carbon dioxide in the SO2 rich recycle, and further so that an amount of a fuel gas introduced to the sulfur removal unit is reduced. The method includes the step of providing an air sweep to the SO2 selective membrane unit permeate side, so that the SO2 rich recycle provides an oxygen source to substitute a portion of air introduced to the sulfur removal unit.

In some embodiments, the SO2 removal system includes an SO2 selective membrane unit, the SO2 selective membrane unit including an SO2 selective membrane unit retentate side and an SO2 selective membrane unit permeate side, and the CO2 removal system includes a CO2 selective membrane unit, the CO2 selective membrane unit including a CO2 selective membrane unit retentate side and a CO2 selective membrane unit permeate side, and the CO2 removal system further includes a polishing SO2 selective membrane unit, the polishing SO2 selective membrane unit including a polishing SO2 selective membrane unit retentate side and a polishing SO2 selective membrane unit permeate side. The method further includes the steps of introducing the SO2 emissions stream to the SO2 selective membrane unit retentate side, the SO2 selective membrane unit operable to allow sulfur dioxide to permeate the SO2 selective membrane in preference to carbon dioxide; causing sulfur dioxide to pass through the SO2 selective membrane in the SO2 selective membrane unit to produce the CO2 removal system feed stream from the SO2 selective membrane unit permeate side; removing the low SO2 discharge stream from the SO2 selective membrane unit retentate side; introducing the CO2 removal system feed stream to the CO2 selective membrane unit retentate side, the CO2 selective membrane unit operable to allow carbon dioxide to permeate the CO2 selective membrane in preference to sulfur dioxide; causing carbon dioxide to pass through the CO2 selective membrane in the CO2 selective membrane unit to produce the CO2 waste gas from the CO2 selective membrane unit permeate side; removing a CO2 membrane retentate stream from the CO2 selective membrane unit retentate side; introducing the CO2 membrane retentate stream to the polishing SO2 selective membrane unit retentate side, the polishing SO2 selective membrane unit operable to allow sulfur dioxide to permeate the SO2 selective membrane in preference to carbon dioxide; causing sulfur dioxide to pass through the SO2 selective membrane in the polishing SO2 selective membrane unit to produce the SO2 rich recycle from the polishing SO2 selective membrane unit permeate side; and removing a polishing SO2 selective membrane retentate stream from the polishing SO2 selective membrane unit retentate side. The method further includes the step of recycling the CO2 waste gas to the SO2 selective membrane unit retentate side, so that additional sulfur dioxide is recovered in the SO2 rich recycle. The method further includes the step of recycling the polishing SO2 selective membrane retentate stream to the SO2 selective membrane unit retentate side, so that additional sulfur dioxide is recovered in the SO2 rich recycle.

In some embodiments, the method also includes the step of recycling the SO2 rich recycle to the sulfur removal unit, so that the introduction of the SO2 rich recycle to the sulfur removal unit allows for additional sulfur recovery while assisting in maintaining a proper temperature profile in the sulfur removal unit due to the lower concentration of carbon dioxide in the SO2 rich recycle, and further so that an amount of a fuel gas introduced to the sulfur removal unit is reduced. The method also includes the step of providing an air sweep to the SO2 selective membrane unit permeate side, so that the SO2 rich recycle provides an oxygen source to substitute a portion of air introduced to the sulfur removal unit. In some embodiments, the SO2 removal system includes a first SO2 selective membrane unit, the first SO2 selective membrane unit including a first SO2 selective membrane unit retentate side and a first SO2 selective membrane unit permeate side, and the SO2 removal system further includes a second SO2 selective membrane unit, the second SO2 selective membrane unit including a second SO2 selective membrane unit retentate side and a second SO2 selective membrane unit permeate side, and further where the CO2 removal system includes a first CO2 selective membrane unit, the first CO2 selective membrane unit including a first CO2 selective membrane unit retentate side and a first CO2 selective membrane unit permeate side, and the CO2 removal system further includes a second CO2 selective membrane unit, the second CO2 selective membrane unit including a second CO2 selective membrane unit retentate side and a second CO2 selective membrane unit permeate side. The method further includes the steps of introducing the SO2 emissions stream to the first SO2 selective membrane unit retentate side, the first SO2 selective membrane unit operable to allow sulfur dioxide to permeate the SO2 selective membrane in preference to carbon dioxide; causing sulfur dioxide to pass through the SO2 selective membrane in the first SO2 selective membrane unit to produce the CO2 removal system feed stream from the first SO2 selective membrane unit permeate side; removing an SO2 membrane retentate stream from the first SO2 selective membrane unit retentate side; introducing the SO2 membrane retentate stream to the second SO2 selective membrane unit retentate side, the second SO2 selective membrane unit operable to allow sulfur dioxide to permeate the SO2 selective membrane in preference to carbon dioxide; causing sulfur dioxide to pass through the SO2 selective membrane in the second SO2 selective membrane unit to produce an SO2 membrane permeate stream from the second SO2 selective membrane unit permeate side; removing the low SO2 discharge stream from the second SO2 selective membrane unit retentate side; introducing the CO2 removal system feed stream to the first CO2 selective membrane unit retentate side, the first CO2 selective membrane unit operable to allow carbon dioxide to permeate the CO2 selective membrane in preference to sulfur dioxide; causing carbon dioxide to pass through the CO2 selective membrane in the first CO2 selective membrane unit to produce the CO2 waste gas from the first CO2 selective membrane unit permeate side; removing a CO2 membrane retentate stream from the first CO2 selective membrane unit retentate side; introducing the CO2 membrane retentate stream to the second CO2 selective membrane unit retentate side, the second CO2 selective membrane unit operable to allow carbon dioxide to permeate the CO2 selective membrane in preference to sulfur dioxide; causing carbon dioxide to pass through the CO2 selective membrane in the second CO2 selective membrane unit to produce a CO2 membrane permeate stream from the second CO2 selective membrane unit permeate side; and removing the SO2 rich recycle from the second CO2 selective membrane unit retentate side. The method also includes the step of providing an air sweep to the second SO2 selective membrane unit permeate side.

In some embodiments, the method also includes the step of recycling the SO2 membrane permeate stream to the sulfur removal unit, where the carbon dioxide concentration of the SO2 membrane permeate stream is lower than the concentration in the SO2 emissions stream, so that the introduction of the SO2 membrane permeate stream to the sulfur removal unit allows for additional sulfur recovery while assisting in maintaining a proper temperature profile in the sulfur removal unit due to the lower concentration of carbon dioxide in the SO2 rich recycle, and further so that an amount of a fuel gas introduced to the sulfur removal unit is reduced. The method further includes the step of recycling the SO2 rich recycle to the sulfur removal unit, so that the introduction of the SO2 rich recycle to the sulfur removal unit allows for additional sulfur recovery while assisting in maintaining a proper temperature profile in the sulfur removal unit due to the lower concentration of carbon dioxide in the SO2 rich recycle, and further so that an amount of a fuel gas introduced to the sulfur removal unit is reduced. The method further includes the step of recycling the CO2 waste gas to the first SO2 selective membrane unit retentate side, so that additional sulfur dioxide is recovered in the SO2 rich recycle. The method further includes the step of recycling the CO2 membrane permeate stream to the first SO2 selective membrane unit retentate side, so that additional carbon dioxide is removed in the CO2 waste gas, and further so that additional sulfur dioxide is recovered in the SO2 rich recycle. The method further includes the step of recycling the CO2 membrane permeate stream to the first CO2 selective membrane unit retentate side, so that additional carbon dioxide is removed in the CO2 waste gas, and further so that additional sulfur dioxide is recovered in the SO2 rich recycle. The method further includes the step of recycling the CO2 waste gas to the second SO2 selective membrane unit retentate side, so that additional sulfur dioxide is recovered in the SO2 rich recycle. The method further includes the step of recycling the low SO2 discharge stream to the first SO2 selective membrane unit permeate side, so that the low SO2 discharge stream creates a gas sweep of the SO2 selective membrane in the first SO2 selective membrane unit permeate side.

In some embodiments, the SO2 removal system includes a first SO2 selective membrane unit, the first SO2 selective membrane unit including a first SO2 selective membrane unit retentate side and a first SO2 selective membrane unit permeate side, and the SO2 removal system further includes a second SO2 selective membrane unit, the second SO2 selective membrane unit including a second SO2 selective membrane unit retentate side and a second SO2 selective membrane unit permeate side, and further wherein the CO2 removal system includes a first CO2 selective membrane unit, the first CO2 selective membrane unit including a first CO2 selective membrane unit retentate side and a first CO2 selective membrane unit permeate side, and the CO2 removal system further includes a second CO2 selective membrane unit, the second CO2 selective membrane unit including a second CO2 selective membrane unit retentate side and a second CO2 selective membrane unit permeate side, and the CO2 removal system further includes a third CO2 selective membrane unit, the third CO2 selective membrane unit including a third CO2 selective membrane unit retentate side and a third CO2 selective membrane unit permeate side. The method further includes the steps of introducing the SO2 emissions stream to the first SO2 selective membrane unit retentate side, the first SO2 selective membrane unit operable to allow sulfur dioxide to permeate the SO2 selective membrane in preference to carbon dioxide; causing sulfur dioxide to pass through the SO2 selective membrane in the first SO2 selective membrane unit to produce the CO2 removal system feed stream from the first SO2 selective membrane unit permeate side; removing an SO2 membrane retentate stream from the first SO2 selective membrane unit retentate side; introducing the SO2 membrane retentate stream to the second SO2 selective membrane unit retentate side, the second SO2 selective membrane unit operable to allow sulfur dioxide to permeate the SO2 selective membrane in preference to carbon dioxide; causing sulfur dioxide to pass through the SO2 selective membrane in the second SO2 selective membrane unit to produce an SO2 membrane permeate stream from the second SO2 selective membrane unit permeate side; removing the low SO2 discharge stream from the second SO2 selective membrane unit retentate side; introducing the CO2 removal system feed stream to the first CO2 selective membrane unit retentate side, the first CO2 selective membrane unit operable to allow carbon dioxide to permeate the CO2 selective membrane in preference to sulfur dioxide; causing carbon dioxide to pass through the CO2 selective membrane in the first CO2 selective membrane unit to produce a first CO2 membrane permeate stream from the first CO2 selective membrane unit permeate side; removing a first CO2 membrane retentate stream from the first CO2 selective membrane unit retentate side; introducing the first CO2 membrane retentate stream to the second CO2 selective membrane unit retentate side, the second CO2 selective membrane unit operable to allow carbon dioxide to permeate the CO2 selective membrane in preference to sulfur dioxide; causing carbon dioxide to pass through the CO2 selective membrane in the second CO2 selective membrane unit to produce a second CO2 membrane permeate stream from the second CO2 selective membrane unit permeate side; removing the SO2 rich recycle from the second CO2 selective membrane unit retentate side; introducing the first CO2 membrane permeate stream to the third CO2 selective membrane unit retentate side, the third CO2 selective membrane unit operable to allow carbon dioxide to permeate the CO2 selective membrane in preference to sulfur dioxide; causing carbon dioxide to pass through the CO2 selective membrane in the third CO2 selective membrane unit to produce the CO2 waste gas from the third CO2 selective membrane unit permeate side; and removing a second CO2 membrane retentate stream from the third CO2 selective membrane unit retentate side.

In some embodiments, the method also includes the step of recycling the SO2 rich recycle to the sulfur removal unit, so that the introduction of the SO2 rich recycle to the sulfur removal unit allows for additional sulfur recovery while assisting in maintaining a proper temperature profile in the sulfur removal unit due to the lower concentration of carbon dioxide in the SO2 rich recycle, and further so that an amount of a fuel gas introduced to the sulfur removal unit is reduced. The method also includes the step of providing an air sweep to the second SO2 selective membrane unit permeate side. The method also includes the step of recycling the second CO2 membrane retentate stream to the first CO2 selective membrane unit retentate side, so that additional CO2 is removed in the CO2 waste gas, and further so that additional sulfur dioxide is recovered in the SO2 rich recycle. The method also includes the step of recycling the second CO2 membrane retentate stream to the first CO2 selective membrane unit retentate side, so that such that additional carbon dioxide is removed in the CO2 waste gas, and further so that additional sulfur dioxide is recovered in the SO2 rich recycle.

In some embodiments, the SO2 removal system includes an SO2 selective membrane unit, the SO2 selective membrane unit including an SO2 selective membrane unit retentate side and an SO2 selective membrane unit permeate side, and the CO2 removal system includes a CO2 selective membrane unit, the CO2 selective membrane unit including a CO2 selective membrane unit retentate side and a CO2 selective membrane unit permeate side. The method further includes the steps of introducing the SO2 emissions stream to the SO2 selective membrane unit retentate side, the SO2 selective membrane unit operable to allow sulfur dioxide to permeate the SO2 selective membrane in preference to carbon dioxide; generating vacuum pressure on the SO2 selective membrane unit permeate side with an SO2 selective membrane vacuum; causing sulfur dioxide to pass through the SO2 selective membrane in the SO2 selective membrane unit to produce an SO2 selective membrane permeate vacuum stream from the SO2 selective membrane unit permeate side; passing the SO2 selective membrane permeate vacuum stream through the SO2 selective membrane vacuum to generate the CO2 removal system feed stream; removing the low SO2 discharge stream from the SO2 selective membrane unit retentate side; introducing the CO2 removal system feed stream to the CO2 selective membrane unit retentate side, the CO2 selective membrane unit operable to allow carbon dioxide to permeate the CO2 selective membrane in preference to sulfur dioxide; generating vacuum pressure on the CO2 selective membrane unit permeate side with a CO2 selective membrane vacuum; causing carbon dioxide to pass through the CO2 selective membrane in the CO2 selective membrane unit to produce a CO2 selective membrane permeate vacuum stream from the CO2 selective membrane unit permeate side; passing the CO2 selective membrane permeate vacuum stream through the CO2 selective membrane vacuum to generate the CO2 waste gas; and removing the SO2 rich recycle from the CO2 selective membrane unit retentate side.

In some embodiments, the SO2 removal system includes an SO2 selective membrane unit, the SO2 selective membrane unit including an SO2 selective membrane unit retentate side and an SO2 selective membrane unit permeate side, and the CO2 removal system includes a CO2 selective membrane unit, the CO2 selective membrane unit including a CO2 selective membrane unit retentate side and a CO2 selective membrane unit permeate side, and the CO2 removal system further includes a polishing SO2 selective membrane unit, the polishing SO2 selective membrane unit comprising a polishing SO2 selective membrane unit retentate side and a polishing SO2 selective membrane unit permeate side. The method further includes the steps of introducing the SO2 emissions stream to the SO2 selective membrane unit retentate side, the SO2 selective membrane unit operable to allow sulfur dioxide to permeate the SO2 selective membrane in preference to carbon dioxide; generating vacuum pressure on the SO2 selective membrane unit permeate side with an SO2 selective membrane vacuum; causing sulfur dioxide to pass through the SO2 selective membrane in the SO2 selective membrane unit to produce an SO2 selective membrane permeate vacuum stream from the SO2 selective membrane unit permeate side; passing the SO2 selective membrane permeate vacuum stream through the SO2 selective membrane vacuum to generate the CO2 removal system feed stream; removing the low SO2 discharge stream from the SO2 selective membrane unit retentate side; introducing the CO2 removal system feed stream to the CO2 selective membrane unit retentate side, the CO2 selective membrane unit operable to allow carbon dioxide to permeate the CO2 selective membrane in preference to sulfur dioxide; generating vacuum pressure on the CO2 selective membrane unit permeate side with a CO2 selective membrane vacuum; causing carbon dioxide to pass through the CO2 selective membrane in the CO2 selective membrane unit to produce a CO2 selective membrane permeate vacuum stream from the CO2 selective membrane unit permeate side; passing the CO2 selective membrane permeate vacuum stream through the CO2 selective membrane vacuum to generate the CO2 waste gas; removing a CO2 membrane retentate stream from the CO2 selective membrane unit retentate side; introducing the CO2 membrane retentate stream to the polishing SO2 selective membrane unit retentate side, the polishing SO2 selective membrane unit operable to allow sulfur dioxide to permeate the SO2 selective membrane in preference to carbon dioxide; generating vacuum pressure on the polishing SO2 selective membrane unit permeate side with a polishing SO2 selective membrane vacuum; causing sulfur dioxide to pass through the SO2 selective membrane in the polishing SO2 selective membrane unit to produce a polishing SO2 selective membrane permeate vacuum stream from the polishing SO2 selective membrane unit permeate side; passing the polishing SO2 selective membrane permeate vacuum stream through the polishing SO2 selective membrane vacuum to generate the SO2 rich recycle; and removing a polishing SO2 selective membrane retentate stream from the polishing SO2 selective membrane unit retentate side.

In some embodiments, the SO2 removal system includes a first SO2 selective membrane unit, the first SO2 selective membrane unit including a first SO2 selective membrane unit retentate side and a first SO2 selective membrane unit permeate side, and the SO2 removal system further includes a second SO2 selective membrane unit, the second SO2 selective membrane unit including a second SO2 selective membrane unit retentate side and a second SO2 selective membrane unit permeate side, and further where the CO2 removal system includes a first CO2 selective membrane unit, the first CO2 selective membrane unit including a first CO2 selective membrane unit retentate side and a first CO2 selective membrane unit permeate side, and the CO2 removal system further includes a second CO2 selective membrane unit, the second CO2 selective membrane unit including a second CO2 selective membrane unit retentate side and a second CO2 selective membrane unit permeate side. The method further includes the steps of introducing the SO2 emissions stream to the first SO2 selective membrane unit retentate side, the first SO2 selective membrane unit operable to allow sulfur dioxide to permeate the SO2 selective membrane in preference to carbon dioxide; generating vacuum pressure on the first SO2 selective membrane unit permeate side with a first SO2 selective membrane vacuum; causing sulfur dioxide to pass through the SO2 selective membrane in the first SO2 selective membrane unit to produce a first SO2 selective membrane permeate vacuum stream from the first SO2 selective membrane unit permeate side; passing the first SO2 selective membrane permeate vacuum stream through the first SO2 selective membrane vacuum to generate the CO2 removal system feed stream; removing an SO2 membrane retentate stream from the first SO2 selective membrane unit retentate side; introducing the SO2 membrane retentate stream to the second SO2 selective membrane unit retentate side, the second SO2 selective membrane unit operable to allow sulfur dioxide to permeate the SO2 selective membrane in preference to carbon dioxide; generating vacuum pressure on the second SO2 selective membrane unit permeate side with a second SO2 selective membrane vacuum; causing sulfur dioxide to pass through the SO2 selective membrane in the second SO2 selective membrane unit to produce a second SO2 selective membrane permeate vacuum stream from the second SO2 selective membrane unit permeate side; passing the second SO2 selective membrane permeate vacuum stream through the second SO2 selective membrane vacuum to generate an SO2 membrane permeate stream; removing the low SO2 discharge stream from the second SO2 selective membrane unit retentate side; introducing the CO2 removal system feed stream to the first CO2 selective membrane unit retentate side, the first CO2 selective membrane unit operable to allow carbon dioxide to permeate the CO2 selective membrane in preference to sulfur dioxide; generating vacuum pressure on the first CO2 selective membrane unit permeate side with a first CO2 selective membrane vacuum; causing carbon dioxide to pass through the CO2 selective membrane in the first CO2 selective membrane unit to produce a first CO2 selective membrane permeate vacuum stream from the first CO2 selective membrane unit permeate side; passing the first CO2 selective membrane permeate vacuum stream through the first CO2 selective membrane vacuum to generate the CO2 waste gas; removing a CO2 membrane retentate stream from the first CO2 selective membrane unit retentate side; introducing the CO2 membrane retentate stream to the second CO2 selective membrane unit retentate side, the second CO2 selective membrane unit operable to allow carbon dioxide to permeate the CO2 selective membrane in preference to sulfur dioxide; generating vacuum pressure on the second CO2 selective membrane unit permeate side with a second CO2 selective membrane vacuum; causing carbon dioxide to pass through the CO2 selective membrane in the second CO2 selective membrane unit to produce a second CO2 selective membrane permeate vacuum stream from the second CO2 selective membrane unit permeate side; passing the second CO2 selective membrane permeate vacuum stream through the second CO2 selective membrane vacuum to generate a CO2 membrane permeate stream; and removing the SO2 rich recycle from the second CO2 selective membrane unit retentate side.

In some embodiments, the SO2 removal system includes a first SO2 selective membrane unit, the first SO2 selective membrane unit including a first SO2 selective membrane unit retentate side and a first SO2 selective membrane unit permeate side, and the SO2 removal system further includes a second SO2 selective membrane unit, the second SO2 selective membrane unit including a second SO2 selective membrane unit retentate side and a second SO2 selective membrane unit permeate side, and further wherein the CO2 removal system includes a first CO2 selective membrane unit, the first CO2 selective membrane unit including a first CO2 selective membrane unit retentate side and a first CO2 selective membrane unit permeate side, and the CO2 removal system further includes a second CO2 selective membrane unit, the second CO2 selective membrane unit including a second CO2 selective membrane unit retentate side and a second CO2 selective membrane unit permeate side, and the CO2 removal system further includes a third CO2 selective membrane unit, the third CO2 selective membrane unit including a third CO2 selective membrane unit retentate side and a third CO2 selective membrane unit permeate side. The method further includes the steps of introducing the SO2 emissions stream to the first SO2 selective membrane unit retentate side, the first SO2 selective membrane unit operable to allow sulfur dioxide to permeate the SO2 selective membrane in preference to carbon dioxide; generating vacuum pressure on the first SO2 selective membrane unit permeate side with a first SO2 selective membrane vacuum; causing sulfur dioxide to pass through the SO2 selective membrane in the first SO2 selective membrane unit to produce a first SO2 selective membrane permeate vacuum stream from the first SO2 selective membrane unit permeate side; passing the first SO2 selective membrane permeate vacuum stream through the first SO2 selective membrane vacuum to generate the CO2 removal system feed stream; removing an SO2 membrane retentate stream from the first SO2 selective membrane unit retentate side; introducing the SO2 membrane retentate stream to the second SO2 selective membrane unit retentate side, the second SO2 selective membrane unit operable to allow sulfur dioxide to permeate the SO2 selective membrane in preference to carbon dioxide; generating vacuum pressure on the second SO2 selective membrane unit permeate side with a second SO2 selective membrane vacuum; causing sulfur dioxide to pass through the SO2 selective membrane in the second SO2 selective membrane unit to produce a second SO2 selective membrane permeate vacuum stream from the second SO2 selective membrane unit permeate side; passing the second SO2 selective membrane permeate vacuum stream through the second SO2 selective membrane vacuum to generate an SO2 membrane permeate stream; removing the low SO2 discharge stream from the second SO2 selective membrane unit retentate side; introducing the CO2 removal system feed stream to the first CO2 selective membrane unit retentate side, the first CO2 selective membrane unit operable to allow carbon dioxide to permeate the CO2 selective membrane in preference to sulfur dioxide; generating vacuum pressure on the first CO2 selective membrane unit permeate side with a first CO2 selective membrane vacuum; causing carbon dioxide to pass through the CO2 selective membrane in the first CO2 selective membrane unit to produce a first CO2 selective membrane permeate vacuum stream from the first CO2 selective membrane unit permeate side; passing the first CO2 selective membrane permeate vacuum stream through the first CO2 selective membrane vacuum to generate a first CO2 membrane permeate stream; removing a first CO2 membrane retentate stream from the first CO2 selective membrane unit retentate side; introducing the first CO2 membrane retentate stream to the second CO2 selective membrane unit retentate side, the second CO2 selective membrane unit operable to allow carbon dioxide to permeate the CO2 selective membrane in preference to sulfur dioxide; generating vacuum pressure on the second CO2 selective membrane unit permeate side with a second CO2 selective membrane vacuum; causing carbon dioxide to pass through the CO2 selective membrane in the second CO2 selective membrane unit to produce a second CO2 selective membrane permeate vacuum stream from the second CO2 selective membrane unit permeate side; passing the second CO2 selective membrane permeate vacuum stream through the second CO2 selective membrane vacuum to generate a second CO2 membrane permeate stream; removing the SO2 rich recycle from the second CO2 selective membrane unit retentate side; introducing the first CO2 membrane permeate stream to the third CO2 selective membrane unit retentate side, the third CO2 selective membrane unit operable to allow carbon dioxide to permeate the CO2 selective membrane in preference to sulfur dioxide; generating vacuum pressure on the third CO2 selective membrane unit permeate side with a third CO2 selective membrane vacuum; causing carbon dioxide to pass through the CO2 selective membrane in the third CO2 selective membrane unit to produce a third CO2 selective membrane permeate vacuum stream from the third CO2 selective membrane unit permeate side; passing the third CO2 selective membrane permeate vacuum stream through the third CO2 selective membrane vacuum to generate the CO2 waste gas; and removing a second CO2 membrane retentate stream from the third CO2 selective membrane unit retentate side.

BRIEF DESCRIPTION OF THE DRAWINGS

These and other features, aspects, and advantages of the present disclosure will become better understood with regard to the following descriptions, claims, and accompanying drawings. It is to be noted, however, that the drawings illustrate only several embodiments of the disclosure and are therefore not to be considered limiting of the scope as it can admit to other equally effective embodiments.

Figure 1:
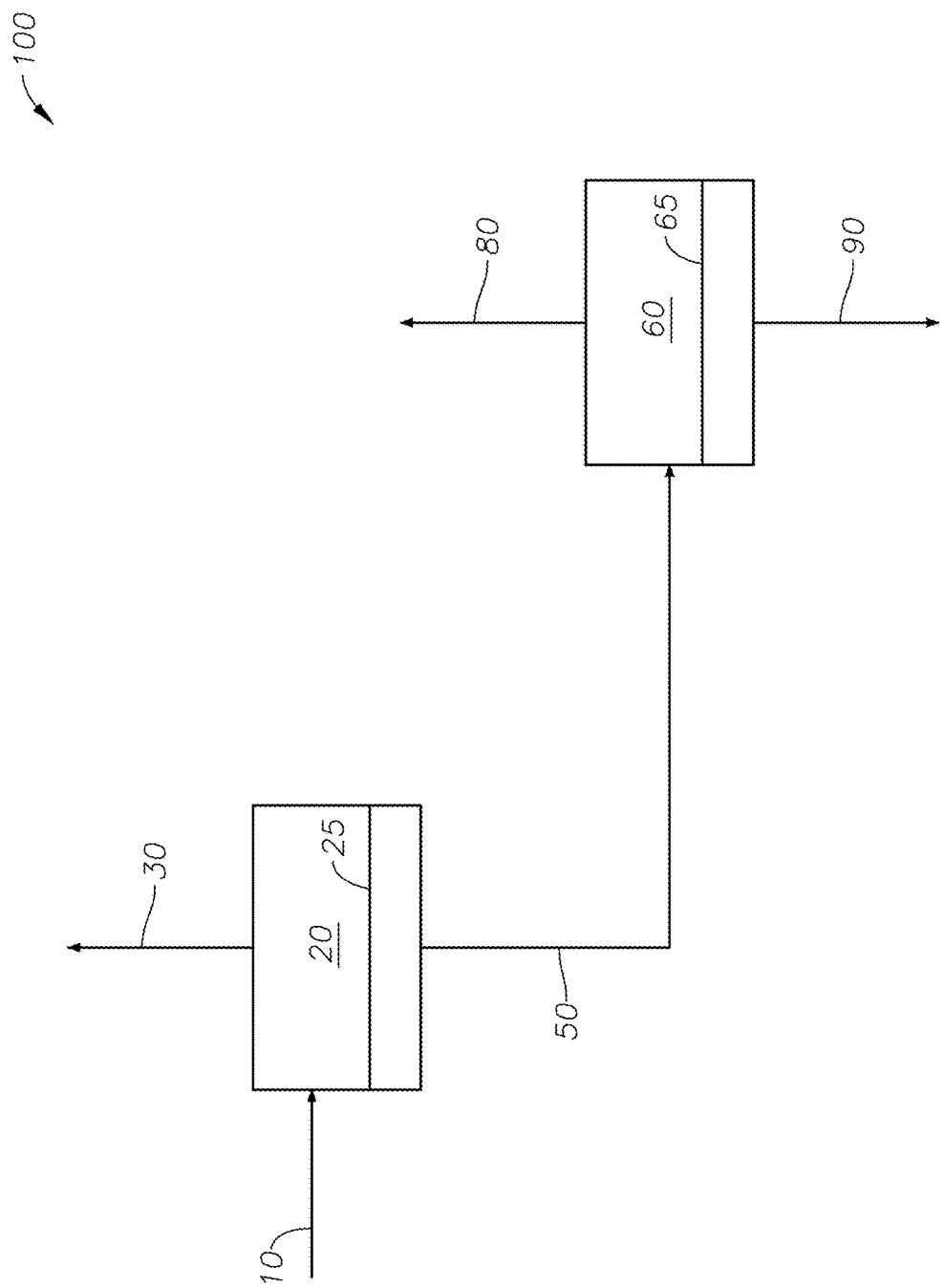
FIG. 1 is a block diagram showing an SO2 emissions management system, according to an embodiment.

In the accompanying Figures, similar components or features, or both, can have a similar reference label. Similarly numbered streams and units have the same composition and operational conditions as described above unless otherwise noted. For the purpose of the simplified schematic illustrations and descriptions of the figures, the numerous pumps, compressors, valves, temperature and pressure sensors, electronic controllers, and the like that can be employed and well known to those of ordinary skill in the art are not included. Transfer lines between the various components of the system can include pipes, conduits, channels, or other suitable physical transfer lines that connect by fluidic communication one or more system components to one or more other system components. Further, accompanying components that are in conventional industrial operations are not depicted. However, operational components, such as those described in the present disclosure, can be added to the embodiments described in this disclosure. Optional recycle lines are shown in dashed lines.

It should further be noted that lines and arrows in the drawings refer to transfer lines which can serve to depict streams between two or more system components. Additionally, lines and arrows that connect to system components define inlets or outlets in each given system component. The arrow direction corresponds generally with the major direction of movement of the materials of the stream contained within the physical transfer line signified by the arrow. Furthermore, lines and arrows which do not connect two or more system components signify a product stream which exits the depicted system or a system inlet stream which enters the depicted system. Product streams can be further processed in processing systems or can be end products. System inlet streams can be streams transferred from accompanying processing systems or can be processed or non-processed feed streams.

DETAILED DESCRIPTION

While the disclosure will be described with several embodiments, it is understood that one of ordinary skill in the relevant art will appreciate that many examples, variations and alterations to the systems and methods described are within the scope and spirit of the disclosure. Accordingly, the embodiments of the disclosure described are set forth without any loss of generality, and without imposing limitations, on the claims.

As used in this disclosure, a "membrane" refers to a structure through which mass transfer can occur under a variety of driving forces. The driving forces can be a pressure differential between the two sides of the membrane generated by a positive pressure on the feed side of the membrane, a vacuum pressure on the permeate side of the membrane, stream component concentration differential between the permeate and retentate sides of the membrane, or combinations of the same. Driving forces that facilitate the transport of one or more components from the inlet gas stream through the selectively permeable membrane can be pressure, concentration, electrical potentials or combinations thereof across the membrane. Membrane operation can be in any mode such as high pressure at the feed side or vacuum pressure on the permeate side. The membrane allows a "penetrant" (a "penetrant" is an entity from a phase in contact with one of the membrane surfaces that passes through the membrane) to pass through the membrane from the retentate into the permeate. As used in this disclosure, the "retentate" is the stream that exits the membrane module without passing through the membrane, and has been depleted of penetrants. The membranes can be single or multilayered. As used in this disclosure, the "permeate" used as a noun can refer to the stream containing penetrants that leaves the membrane module, or can refer to the liquids and gases that have permeated the membrane of a membrane unit. Permeate can also be used in this disclosure as a verb, and means to spread through or flow through or pass through a membrane of a membrane unit. As an example, liquids and gases can permeate a membrane.

As used in this disclosure, "selective layer" refers to the membrane layer that is active in allowing the penetrant to pass through the membrane generating the permeate stream. As used in this disclosure, when a membrane is "selective for" a gas, that refers to the property of the membrane that allows more mass transport across the membrane material of one component as compared to the other component. For example, a $CO_2$ over $SO_2$ selective membrane preferentially transports $CO_2$ through the membrane in the presence of $SO_2$ and other components in the process stream to produce a $CO_2$-enriched permeate and a $CO_2$-depleted retentate. A membrane that is selective for one compound over another, such as a $CO_2$ over $SO_2$ selective membrane can be depicted as the following: $CO_2$ over $SO_2$, $CO_2/SO_2$, or $CO_2$ vs. $SO_2$.

As used in this disclosure, "thin-film, composite membranes" refers to membranes that consist of a thin polymer barrier layer formed on one or more porous support layers. The polymer barrier layer determines the flux and separation characteristics of the membrane; the porous backing serves only as a support for the selective layer and has no effect on membrane transport properties. As used in this disclosure, a reference to a membrane containing a specific material refers to the material used in the selective layer. The support structure can be made of any material.

As used in this disclosure, a "membrane module" refers to a manifold assembly containing a membrane or membranes to separate the streams of feed, permeate, and retentate. The membrane module can be any type of membrane module, including hollow fiber membrane modules, plate-and-frame membrane modules, capillary fiber membrane modules, spiral wound membrane modules, or potted hollow-fiber modules. Membranes can be arranged in the membrane module in a variety of configurations. Membranes can be in a flat-sheet configuration, a plate and frame configuration, or can be arranged to increase packing density, for example in a hollow-fiber or a capillary configuration or a spirally-wound configuration.

As used in this disclosure, a "sweep" refers to a nonpermeating gas stream that passes continuously by the downstream membrane face such that the permeate does not sit statically against the permeate side of the membrane, but is collected by the gas stream. The sweep can provide a driving force for the separation.

As used in this disclosure, "air" refers to the collective gases that constitute earth's atmosphere. Air contains nitrogen, oxygen, argon, carbon dioxide, water vapor, and other components. Unless otherwise indicated, the use of the term air includes all of the gases listed.

As used in this disclosure, a "stage" refers to a membrane process configuration where an additional membrane is positioned on the permeate discharge of a first membrane. Generally, additional compression is needed between the first membrane and the additional membrane because the permeate discharge is at a lower pressure than what is required to provide a driving force for separation. A multi-stage configuration can also have multiple recycles between membranes.

As used in this disclosure, a "step" refers to a membrane process configuration where an additional membrane is positioned on the retentate discharge of a first membrane. Generally, no additional compression is needed between the first membrane and the additional membrane, because the retentate discharge stream is at almost the same feed pressure. A multi-step configuration can also have multiple recycles between membranes.

The description may use the phrases "in some embodiments," "in an embodiment," or "in embodiments," which can each refer to one or more of the same or different embodiments. Furthermore, the terms "comprising," "including," "containing," and the like, as used with respect to embodiments of the present disclosure, are synonymous.

For the purposes of describing and defining the present disclosure, a composition that "substantially contains" a particular compound includes at least 51% by weight of that particular compound.

As used in this disclosure, the term "about" is utilized to represent the inherent degree of uncertainty that may be attributed to any quantitative comparison, value, measurement, or other representation. The term "about" is also utilized in this disclosure to represent the degree by which a quantitative representation can vary from a stated reference without resulting in a change in the basic function of the subject matter at issue.

Embodiments of methods and systems to increase sulfur recovery and separate $SO_2$ and $CO_2$ from the tail gas and $SO_2$ emissions streams from industrial processes, including the Claus sulfur recovery systems, are provided herein. The methods and systems use $CO_2$ and $SO_2$ selective membranes which selectively permeate $CO_2$ and $SO_2$ respectively over other components. An emissions stream containing $SO_2$ emissions is sent to a membrane separation unit which includes an membrane selective for $SO_2$ over other compounds, including $CO_2$. The $SO_2$ enriched permeate or $SO_2$ depleted retentate can then be sent to additional membrane units that can contain membranes selective for $SO_2$ to further concentrate or remove the $SO_2$, or can be treated in a membrane selective for $CO_2$ over other compounds, including $SO_2$. The treatment in the membrane units results in a concentrated $SO_2$ stream that can be recycled with a 3 to 5 fold enrichment in $SO_2$, and a $CO_2$ enriched stream that includes a low concentration of $SO_2$, such as less than 150 ppm.

The concentrated $SO_2$ stream has a lower concentration of $CO_2$ than the emissions stream, so that when the concentration $SO_2$ stream is recycled to the sulfur removal unit, the reduced $CO_2$ content assists in maintaining a proper temperature profile in the sulfur removal unit and results in requiring less fuel in the sulfur removal unit. Increased $CO_2$ content requires additional fuel use in the reactors and heaters in the sulfur removal unit since $CO_2$ has no heating value and does not contribute to the reactions. Due to the reduced $CO_2$ content, the operability of the sulfur removal unit is improved. Therefore, reducing $CO_2$ content in the $SO_2$ concentrated streams recycled to the sulfur recovery units results in significant advantages.

If the $SO_2$ rich permeate from the $SO_2$ over $CO_2$ selective membrane has more than 50% $CO_2$, then additional $CO_2$ removal and $SO_2$ purification to further reduce the amount of gas and the amount of $CO_2$ recycled to the sulfur removal units. Thus, the $SO_2$ concentrated streams can have 5% to 20% more $SO_2$ than the original tail gas and $SO_2$ emissions stream treated with the membrane units. Additionally, the $SO_2$ enriched stream recycled to the sulfur recovery unit is less than the 10% of the original stream volume, and can be less than 5% of the original stream volume, so that the $SO_2$ enriched stream can be recycled to multiple points within the sulfur removal unit without affecting or disrupting plant operations. If the $SO_2$ rich permeate from the $SO_2$ over $CO_2$ selective membrane has less than 25% $CO_2$, then $SO_2$ purification can be used to further concentrate the gas stream.

Advantages to the methods and systems include those stated above, as well as additional advantages in increased sulfur recovery, reduced emissions, increased cost-effectiveness, and ability to retrofit existing systems. The addition of an air sweep improves efficiency of the membranes. Additionally, when an air sweep is utilized along with the $SO_2$ selective membrane, the $SO_2$ enriched recycle stream has oxygen that can replace some or all of the air introduced to the sulfur removal units. When the permeate from the $SO_2$ selective membrane is further treated with $CO_2$ selective membranes, the $SO_2$ enriched stream recycled to the sulfur removal units is also oxygen enriched.

The $SO_2$ over $CO_2$ selective membrane, referred to as an SO2 selective membrane herein, can be a rubbery polar membrane. The SO2 selective membrane can be a composite membrane containing one or polymers. The SO2 selective membranes can have a selectivity of 3 and above. In some embodiments, the SO2 selective membrane is performed in a relatively low pressure process, such as membrane processes at 1 bar of pressure or less where the mass transfer is driven by concentration differentials or sweep gases, and not by pressure differential. In these embodiments, the membranes are housed in plate-and-frame membrane modules, or in capillary fiber membrane modules. In some embodiments, portions of the $SO_2$ concentration utilizing the SO2 selective membranes are performed in a higher pressure process, such as 10 to 15 bar, and therefore the $SO_2$ selective membranes are house in spiral wound membrane modules.

The SO2 selective membrane can be made from PEBAX™ (a registered trademark of Arkema) 4011. The permeation properties of a membrane containing PEBAX™ 4011 is included in Table 1, below. The properties of the membrane in Table 1 were tested at 23° C., with a gas mixture at 2.5 psig pressure containing 82.6% $N_2$, 7.0% $O_2$, 10.0% $CO_2$, and 0.4% $SO_2$. The permeating gas was kept at 22 mmHg absolute pressure. The resulting permeate contained 13.2% $N_2$, 2.5% $O_2$, 72.5% $CO_2$, and 11.8% $SO_2$.

TABLE 1

Properties of PEBAX™ 4011 Composite Membrane

| Gas | Flux (1 × $10^{-6}$ $cm^3$ (STP)/$cm^2 \cdot s \cdot cmHg$) | Selectivity over $N_2$ |
|---|---|---|
| $N_2$ | 5.0 gpu | 1 |
| $O_2$ | 11 gpu | 2.2 |
| $CO_2$ | 280 gpu | 56 |
| $SO_2$ | 3,500 gpu | 700 |

The $SO_2$ selective membrane can be made from PEBAX™ 2533 material. A membrane containing PEBAX™ 2533 material can have an $SO_2$ permeance of 2,000 gpu, a $CO_2$ permeance of 200 gpu, an $N_2$ permeance of 10 gpu, and an $O_2$ permeance of 20 gpu.

The $CO_2$ over $SO_2$ selective membrane, referred to as a CO2 selective membrane herein, can be a composite membrane containing one or more polymers. The CO2 selective membrane can contain a glassy polymer. The glassy polymer can be hydrophobic. The glassy polymer can include a glassy perfluoropolymer. Glassy perfluoropolymer containing membranes can exhibit high $CO_2$ selectivities. The CO2 selective membrane can have a selectivity for $CO_2$ over $SO_2$ of 5 or more, alternately 10 or more, alternately 20 or more, and alternately 30 or more. In some embodiments, the CO2 selective membranes are performed in a higher pressure process, such as 10 to 15 bar, and therefore the CO2 selective membranes are house in spiral wound membrane modules.

The CO2 selective membrane can contain commercially available amorphous perfluoropolymers such as CYTOP™ (a registered trademark of Asahi) material, HYFLON™ (a registered trademark of Solvay) material, TEFLON™ (a registered trademark of DuPont) AF material, or combinations of the same. These materials are commercially available amorphous perfluoropolymers.

CYTOP™ material is a polymer made of the monomer having the chemical structure of:

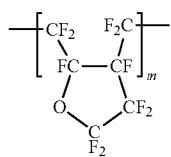

The variable m can be repeated to generate the polymer. Membranes containing CYTOP™ material are $CO_2/SO_2$ selective. Acceptable grades of CYTOP™ material include CYTOP-A and CYTOP-M. CYTOP-A includes an R structure of —COOH between or at the end of the repeating monomers. CYTOP-M includes an R structure of —CONH—SI(OR')$_3$ between or at the end of the repeating monomers. All grades of CYTOP™ material are acceptable for use in the membranes.

HYFLON™ material is a copolymer made of the monomer having the chemical structures of:

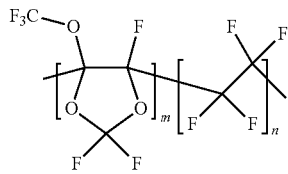

The variables m or n can be repeated to generate the polymer. Acceptable grades of HYFLON™ material includes HYFLON HD40, where m=0.4 and n=0.6; HYFLON HD60, where m=0.6, and n=0.4; and HYFLON HD80, where m=0.8 and n=0.2. The $CO_2/SO_2$ selectivity of HYFLON™ containing membranes are in the range of 4 to 5. Additional information on the properties of HYFLON™ containing membranes can be found in Table 1.

TEFLON™ AF material is a copolymer made of the monomers having the chemical structures of:

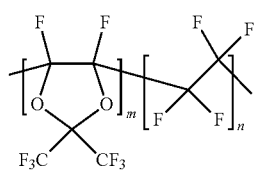

The variables m or n can be repeated to generate the polymer. Various grades of TEFLON™ AF material can be used, such as TEFLON™ AF2400 and TEFLON™ AF1400. TEFLON™ AF material is made of copolymers of 2,2-bistrifluoromethyl-4,5-difluoro-1,3-dioxole (PPD), shown as monomer m above, and tetrafluoroethylene (TFE), shown as monomer n above, where m=0.87 and n=0.13. Membranes containing TEFLON™ material have a typical selectivity for $CO_2/SO_2$ of 4 to 5. Other grades of TEFLON™ material can be used in the CO2 selective membrane, including TEFLON™ AD60 and TEFLON™ AD80.

The CO2 selective membrane can contain homopolymers of CYTOP™ material, HYFLON™ material or TEFLON™ material; or copolymers of CYTOP™ material, HYFLON™ material or TEFLON™ material; or block copolymers of CYTOP™ material, HYFLON™ material or TEFLON™ material; or terpolymers of CYTOP™ material, HYFLON™ material or TEFLON™ material; or block terpolymers of CYTOP™ material, HYFLON™ material or TEFLON™ material; or copolymers of combinations of CYTOP™ material, HYFLON™ material or TEFLON™ material; or block copolymers of combinations of CYTOP™ material, HYFLON™ material or TEFLON™ material. For example, the material can be a terpolymer of the CYTOP™ monomer and the TEFLON™ monomers.

The CO2 selective membrane can contain materials made from homopolymers, copolymers, block copolymers, terpolymers, or block terpolymers generated from the monomers perfluoro (2-methylene-1,3-dioxolane) (PFMD); perfluoro (2-methylene-4,5-dimethyl-1,-dioxolane) (PFMDD); perfluoro-2,2-dimethyl-1,3-dioxole (PDD); and perfluoro-3-butenyl-vinyl ether (PBVE).

PDD has the following chemical structure:

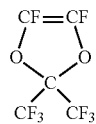

PBVE has the following chemical structure:

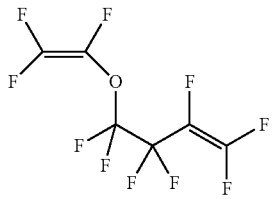 [SMILES: FC(F)=C(F)OC(F)(F)C(F)(F)C(F)=C(F)F]

Properties and selectivities of CO2 selective membranes containing different polymer materials are listed in Table 2. Perfluoro Polymer A is a copolymer of PFMD and PFMDD.

TABLE 2

Mixed Gas Selectivities with a Feed Gas of 1-5% $SO_2$, 10% $O_2$, and 78.5% $N_2$ Saturated with Water at 50 psig and 25° C.

| Polymer | $N_2$ permeance (gpu) | $CO_2$ permeance (gpu) | $SO_2$ permeance (gpu) | $CO_2/SO_2$ selectivity |
|---|---|---|---|---|
| Hyflon 40 | 22 | 150 | 34 | 4.5 |
| Hyflon 60 | 86 | 540 | 125 | 4.3 |
| Perfluoro Polymer A | 29 | 220 | 19 | 12 |
| Perfluoro Polymer B | 200 | 2,000 | 200 | 10 |

The CO2 selective membrane can contain a glassy hydrophobic perfloropolymer. The CO2 selective membrane can be made of a homopolymer, copolymer, block copolymer, terpolymer, or block terpolymer of a combination of monomers A through H, pictured below:

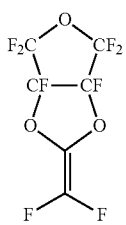
A

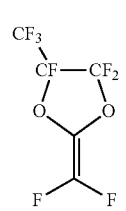
B

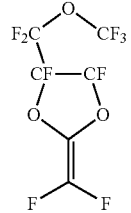
C

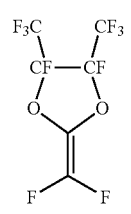
D

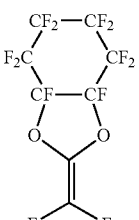
E

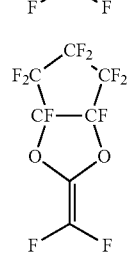
F

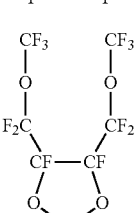
G

H

For example, the membrane can contain a homopolymer of monomer C. The membrane can contain a copolymer of monomer C and B, or the membrane can contain a block copolymer of monomers C and B. The membrane can contain a terpolymers of monomers C, B and G, or can be a block terpolymer of monomers C, B, D, G and H. The membrane can contain copolymers of monomers B and H, or can be a block terpolymers of monomers C, B, D, E, and G. The membrane can contain multiple materials made of the various polymer generated from the homopolymers, copolymers, block copolymers, terpolymers, or block terpolymers of monomers A through H. For example, the membrane can contain a layer containing a material made of a block copolymer of monomers A and E, and the membrane my further contain a layer containing a material made of a terpolymer of monomers D, F, and H. Any combination of the above monomers generating a polymer is envisioned as a possible use for the membrane material in this disclosure.

In some preferred embodiments, the CO2 selective membrane contains a random amorphous polymer made from homopolymers or copolymers made from monomers B, D, and H. The CO2 selective membrane can contain copolymers with the compositions shown in the table below:

TABLE 3

Typical Tg for Possible Copolymer Compositions

| Polymer | Monomer D component mol % | Monomer H component mol % | $T_g$ (° C.) |
|---|---|---|---|
| 1 | 100 | 0 | 165 |
| 2 | 74 | 26 | 155 |
| 3 | 58 | 42 | 145 |
| 4 | 43 | 57 | 125 |
| 5 | 20 | 80 | 106 |
| 6 | 0 | 100 | 228 ($T_m$) |

Referring to FIG. 1, SO2 emissions management system 100 is shown. SO2 emissions stream 10 is introduced to SO2 removal system 20. SO2 emissions stream 10 can be generated from an incinerator, such as the incinerators burning tail gas streams generated from sulfur recovery units. SO2 emissions stream 10 can be generated from the thermal oxidizer used to control the discharges from amine units. SO2 emissions stream 10 can be generated from the thermal oxidizer controlling the final tail gas containing H$_2$S from sulfur recovery units. SO2 emissions stream 10 can be generated from other emissions streams containing SO$_2$, such as metallurgical smelting processes or FCC catalyst regeneration processes. SO2 emissions stream 10 contains SO$_2$, CO$_2$, N$_2$, O$_2$, and water vapor. SO2 emissions stream 10 can include SO2 concentrations greater than 0.01 mol %, alternately greater than 0.05 mol %, and alternately greater than 0.1 mol %. SO2 emission stream 10 can be at a pressure under about 10 barg. SO2 removal system 20 includes SO2 selective membrane 25. SO2 selective membrane 25 can have any of the characteristics and compositions as any of the SO2 selective membranes discussed herein.

SO2 removal system 20 separates SO$_2$ from the SO2 emissions stream 10 by membrane separation processes. SO2 selective membrane 25 preferentially allows SO$_2$ to permeate the membrane. CO$_2$ and water vapor also permeates SO2 selective membrane 25. SO2 removal system 20 generates low SO2 discharge stream 30 and CO2 removal system feed stream 50. Low SO2 discharge stream 30 contains less SO$_2$ than SO2 emissions stream 10. Low SO2 discharge stream 30 can contain SO$_2$ in a concentration less than 150 ppm, alternately less than 140 ppm, alternately less than 120 ppm, alternately less than 100 ppm, alternately less than 90 ppm, alternately less than 75 ppm, and alternately less than 50 ppm. CO2 removal system feed stream 50 has a greater concentration of SO$_2$ than SO2 emissions stream 10. CO2 removal system feed stream 50 contains CO$_2$, SO$_2$, air, and water vapor.

CO2 removal system feed stream 50 is introduced to CO2 removal system 60. CO2 removal system 60 includes a membrane module with CO2 selective membrane 65. CO2 selective membrane 65 can have any of the characteristics and compositions as any of the CO2 selective membranes discussed herein. CO2 removal system 60 separates CO2 and SO2 from the CO2 removal system feed stream 50. CO2 selective membrane 65 preferentially allows CO$_2$ to permeate the membrane. CO2 removal system 60 generates SO2 rich recycle 80 and CO2 waste gas 90. SO2 rich recycle 80 has a higher concentration of SO$_2$ than CO2 removal system feed stream 50 and SO2 emissions stream 10. SO2 rich recycle 80 can substantially contain SO$_2$. SO2 rich recycle 80 can have an SO$_2$ concentration greater than 10 mol %, alternately greater than 15 mol %, alternately greater than 20 mol %, and alternately greater than 50 mol %. Advantageously, SO2 rich recycle 80 can have a reduced volume compared to SO2 emissions stream 10. CO2 waste gas 90 contains a higher concentration of CO$_2$ than the CO2 removal system feed stream 50. CO2 waste gas 90 substantially contains CO$_2$. Additional compression can be provided to increase pressure of the streams being introduced to the membrane modules.

Figure 2:
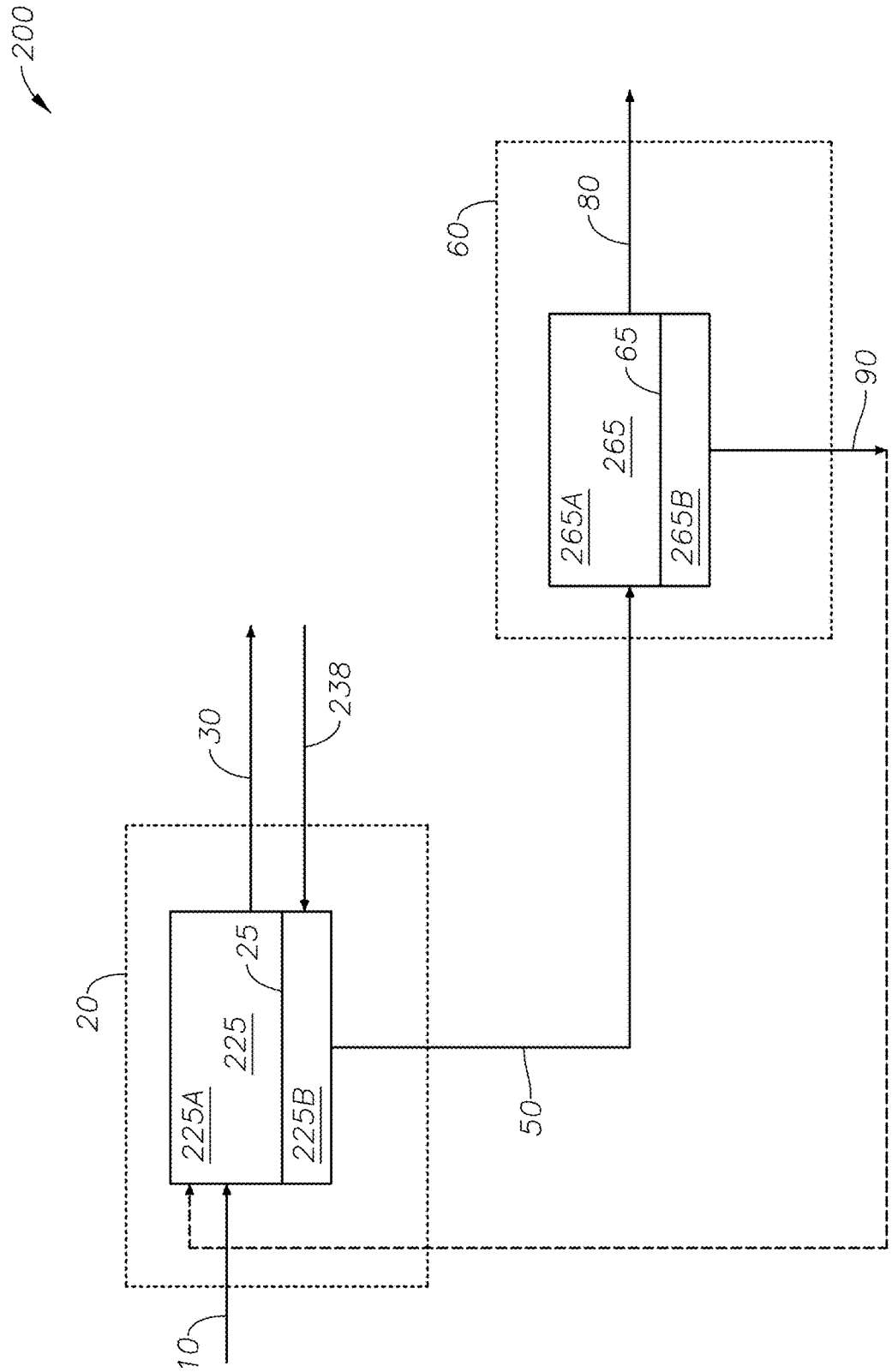
FIG. 2 is a block diagram showing an SO2 emissions management system with single membrane modules, according to an embodiment.

Referring to FIG. 2, SO2 emissions management system with single membrane modules 200 is shown. SO2 emissions management system with single membrane modules 200 can be utilized where reductions in the amount or concentrations of CO$_2$ recycled to the sulfur removal units are desired to assist in sulfur removal unit operations and improve sulfur recovery from tail gas and emissions streams. SO2 emissions stream 10 is introduced to SO2 removal system 20. SO2 removal system 20 includes SO2 selective membrane unit 225. SO2 selective membrane unit 225 includes SO2 selective membrane 25 which separates SO2 selective membrane unit retentate side 225A and SO2 selective membrane unit permeate side 225B. SO2 emissions stream 10 is introduced to SO2 selective membrane unit retentate side 225A. SO2 selective membrane 25 selectively allows SO$_2$ to permeate the membrane. Air sweep 238 is introduced to SO2 removal system 20. Air sweep 238 contains air. Air sweep 238 is introduced to SO2 selective membrane unit permeate side 225B.

Low SO2 discharge stream 30 is removed from SO2 selective membrane unit retentate side 225A, and exits SO2 removal system 20. CO2 removal system feed stream 50 is removed from SO2 selective membrane unit permeate side 225B. CO2 removal system feed stream 50 contains SO$_2$, CO$_2$, water vapor, and additional air introduced from the air sweep.

CO2 removal system feed stream 50 is introduced to CO2 removal system 60. CO2 removal system 60 includes CO2 selective membrane unit 265. CO2 selective membrane unit 265 includes CO2 selective membrane 65 which separates CO2 selective membrane unit retentate side 265A and CO2 selective membrane unit permeate side 265B. CO2 selective membrane 65 preferentially allows CO$_2$ to permeate the membrane. SO2 rich recycle 80 is removed from CO2 selective membrane unit retentate side 265A and exits CO2 removal system 60. CO2 waste gas 90 is removed from CO2 selective membrane unit permeate side 265B and exits CO2 removal system 60. CO2 waste gas 90 can be recycled to SO2 removal system 20 and introduced to SO2 selective membrane unit retentate side 225A to improve SO$_2$ recovery. Additional compression can be provided to increase pressure of the streams being introduced to the membrane units.

Figure 3:
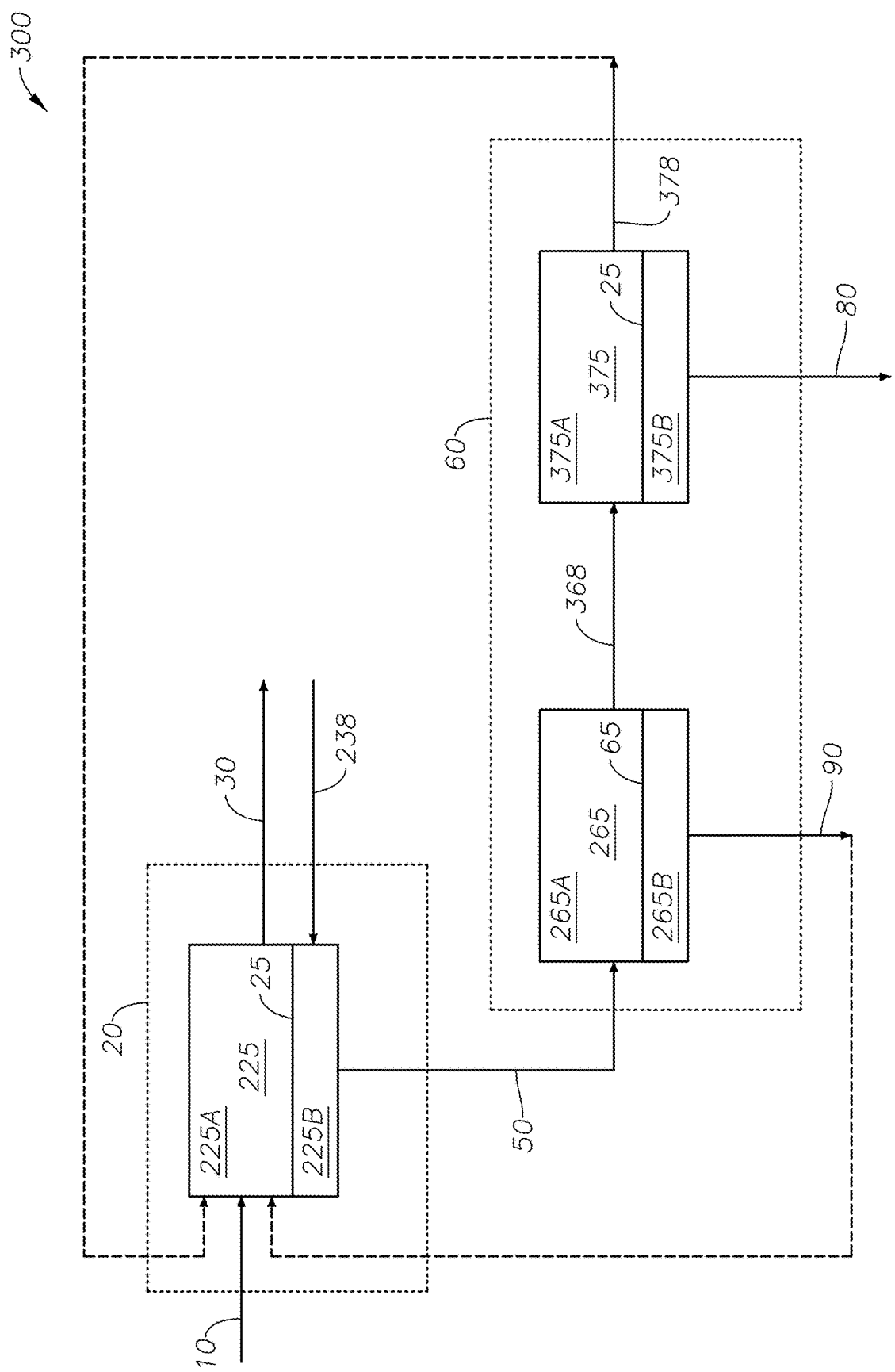
FIG. 3 is a block diagram showing an SO2 emissions management system with double membrane modules for $CO_2$ removal, according to an embodiment.

Referring to FIG. 3, SO2 emissions management system with double membrane modules for CO2 removal 300 is shown. SO2 emissions management system with double membrane modules for CO2 removal 300 can be utilized where further reductions in the amount or concentrations of CO$_2$ recycled to the sulfur removal units are desired to assist in sulfur removal unit operations and improve sulfur recovery from tail gas and emissions streams.

SO2 emissions stream 10 is introduced to SO2 removal system 20. SO2 removal system 20 includes SO2 selective membrane unit 225. SO2 selective membrane unit 225 includes SO2 selective membrane 25 which separates SO2 selective membrane unit retentate side 225A and SO2 selective membrane unit permeate side 225B. SO2 emissions stream 10 is introduced to SO2 selective membrane unit retentate side 225A. SO2 selective membrane 25 selectively allows $SO_2$ to permeate the membrane. Air sweep 238 is introduced to SO2 removal system 20. Air sweep 238 is introduced to SO2 selective membrane unit permeate side 225B.

Low SO2 discharge stream 30 is removed from SO2 selective membrane unit retentate side 225A, and exits SO2 removal system 20. CO2 removal system feed stream 50 is removed from SO2 selective membrane unit permeate side 225B.

CO2 removal system feed stream 50 is introduced to CO2 removal system 60. CO2 removal system 60 includes CO2 selective membrane unit 265 and polishing SO2 selective membrane unit 375. CO2 selective membrane unit 265 includes CO2 selective membrane 65 which separates CO2 selective membrane unit retentate side 265A and CO2 selective membrane unit permeate side 265B. Polishing SO2 selective membrane unit 375 includes SO2 selective membrane 25 which separates polishing SO2 selective membrane unit retentate side 375A and polishing SO2 selective membrane unit permeate side 375B. CO2 selective membrane 65 preferentially allows $CO_2$ to permeate the membrane. CO2 membrane retentate stream 368 is removed from CO2 selective membrane unit retentate side 265A. CO2 membrane retentate stream 368 contains a lower concentration of $CO_2$ than CO2 removal system feed stream 50. CO2 waste gas 90 is removed from CO2 selective membrane unit permeate side 265B and exits CO2 removal system 60. CO2 waste gas 90 can be recycled to SO2 removal system 20 and introduced to SO2 selective membrane unit retentate side 225A to improve $SO_2$ recovery.

CO2 membrane retentate stream 368 is introduced to polishing SO selective membrane unit retentate side 375A of polishing SO2 selective membrane unit 375. SO2 selective membrane 25 preferentially allows $SO_2$ to permeate the membrane. SO2 rich recycle 80 is removed from polishing SO2 selective membrane unit permeate side 375B and exits CO2 removal system 60. SO2 rich recycle 80 has a lower concentration of $CO_2$ and a higher concentration of $SO_2$ than CO2 membrane retentate stream 368. Polishing SO2 selective membrane retentate stream 378 is removed from polishing SO2 selective membrane unit retentate side 375A. Polishing SO2 selective membrane retentate stream 378 can be recycled to $SO_2$ removal system 20 and introduced to SO2 selective membrane unit retentate side 225A to improve $SO_2$ recovery. Polishing SO2 selective membrane retentate stream 378 has a higher concentration of $CO_2$ than the CO2 membrane retentate stream 368. Additional compression can be provided to increase pressure of the streams being introduced to the membrane units.

Figure 4:
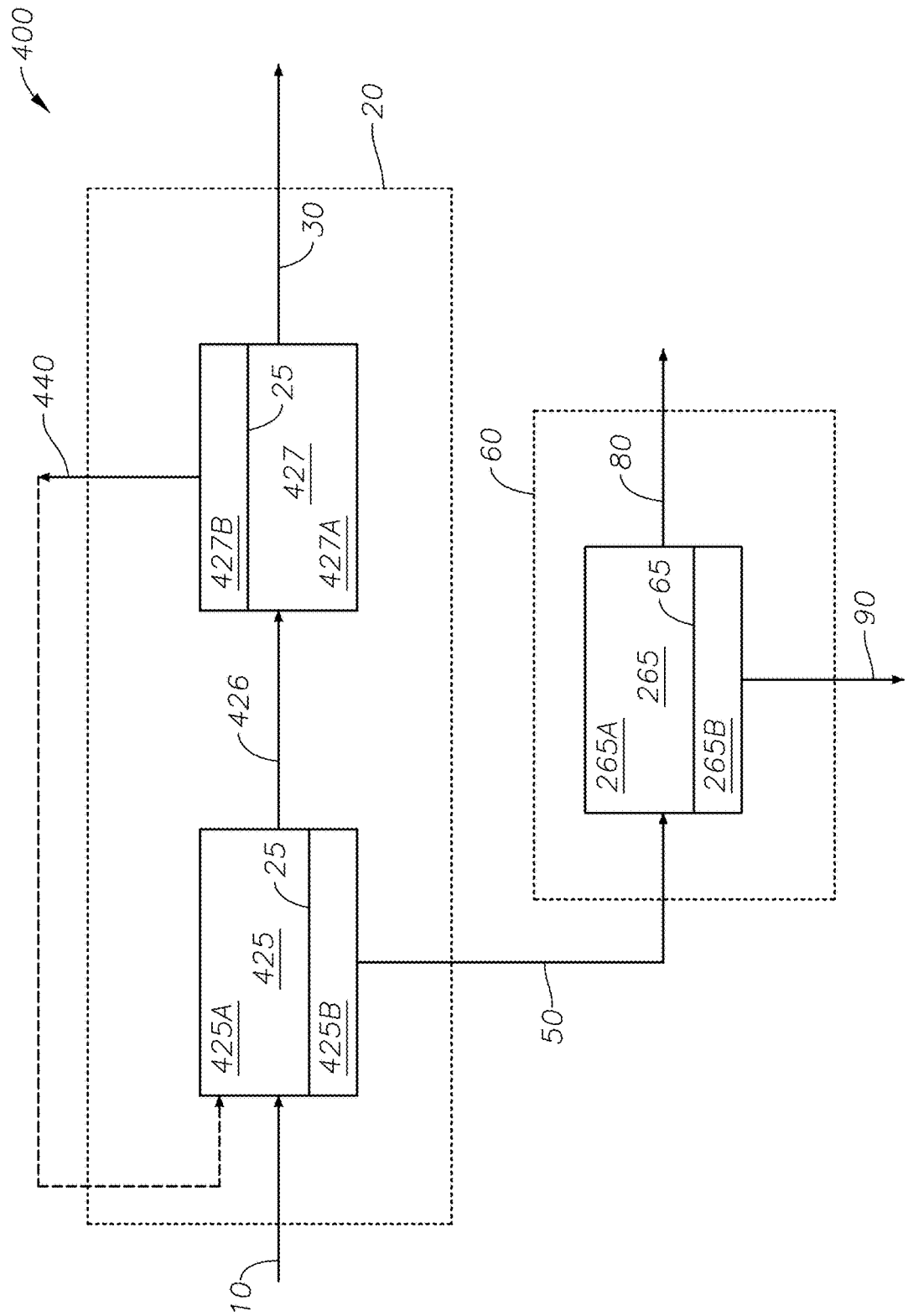
FIG. 4 is a block diagram showing an SO2 emissions management system with double membrane modules for SO2 removal, according to an embodiment.

Referring to FIG. 4, SO2 emissions management system with double membrane modules for SO2 removal 400 is shown. SO2 emissions management system with double membrane modules for SO2 removal 400 can be used when additional reductions in SO2 in the low SO2 discharge stream 30 is required or when efficiency is desired. SO2 emissions management system with double membrane modules for SO2 removal 400 can be utilized where further reductions in the amount or concentrations of $CO_2$ recycled to the sulfur removal units are desired to assist in sulfur removal unit operations and improve sulfur recovery from tail gas and emissions streams. The arrangement of membrane modules in FIG. 4, and similar arrangements, is especially suited for treating $SO_2$ containing emissions streams from Claus Plants where the $H_2$ content is at an intermediate concentration of about 55 mol % of $H_2S$ in the Claus reaction furnace feed gas.

SO2 emissions stream 10 is introduced to SO2 removal system 20. SO2 removal system 20 includes first SO2 selective membrane unit 425 and second SO2 selective membrane unit 427. First SO2 selective membrane unit 425 includes SO2 selective membrane 25 which separates first SO2 selective membrane unit retentate side 425A and first SO2 selective membrane unit permeate side 425B. Second SO2 selective membrane unit 427 includes SO2 selective membrane 25 which separates second SO2 selective membrane unit retentate side 427A and second SO2 selective membrane unit permeate side 427B.

SO2 emissions stream 10 is introduced to first SO2 selective membrane unit retentate side 425A. SO2 selective membrane 25 selectively allows $SO_2$ to permeate the membrane. CO2 removal system feed stream 50 is removed from first SO2 selective membrane unit permeate side 425B and exits SO2 removal system 20. SO2 membrane retentate stream 426 is removed from first SO2 selective membrane unit retentate side 425A. SO2 membrane retentate stream 426 contains a lower concentration of $SO_2$ than SO2 emissions stream 10. SO2 membrane retentate stream 426 is introduced to second SO2 selective membrane unit retentate side 427A. $SO_2$ preferentially permeates SO2 selective membrane 25 in second SO2 selective membrane unit 427. SO2 membrane permeate stream 440 is removed to second SO2 selective membrane unit permeate side 427B. $SO_2$ membrane permeate stream 440 contains $CO_2$, $SO_2$, and water vapor. SO2 membrane permeate stream 440 has a higher concentration of $SO_2$ than SO2 membrane retentate stream 426. SO2 membrane permeate stream 440 can be recycled to first SO2 selective membrane unit retentate side 425A to improve $SO_2$ recovery. Low SO2 discharge stream 30 is removed from second SO2 selective membrane unit retentate side 427A, and exits SO2 removal system 20. Low SO2 discharge stream 30 contains a lower concentration of $SO_2$ than SO2 membrane retentate stream 426.

CO2 removal system feed stream 50 is introduced to CO2 removal system 60. CO2 removal system 60 includes CO2 selective membrane unit 265. CO2 selective membrane unit 265 includes CO2 selective membrane 65 which separates CO2 selective membrane unit retentate side 265A and CO2 selective membrane unit permeate side 265B. CO2 selective membrane 65 preferentially allows $CO_2$ to permeate the membrane. SO2 rich recycle 80 is removed from CO2 selective membrane unit retentate side 265A and exits CO2 removal system 60. CO2 waste gas 90 is removed from CO2 selective membrane unit permeate side 265B and exits CO2 removal system 60. Additional compression can be provided to increase pressure of the streams being introduced to the membrane units.

Figure 5:
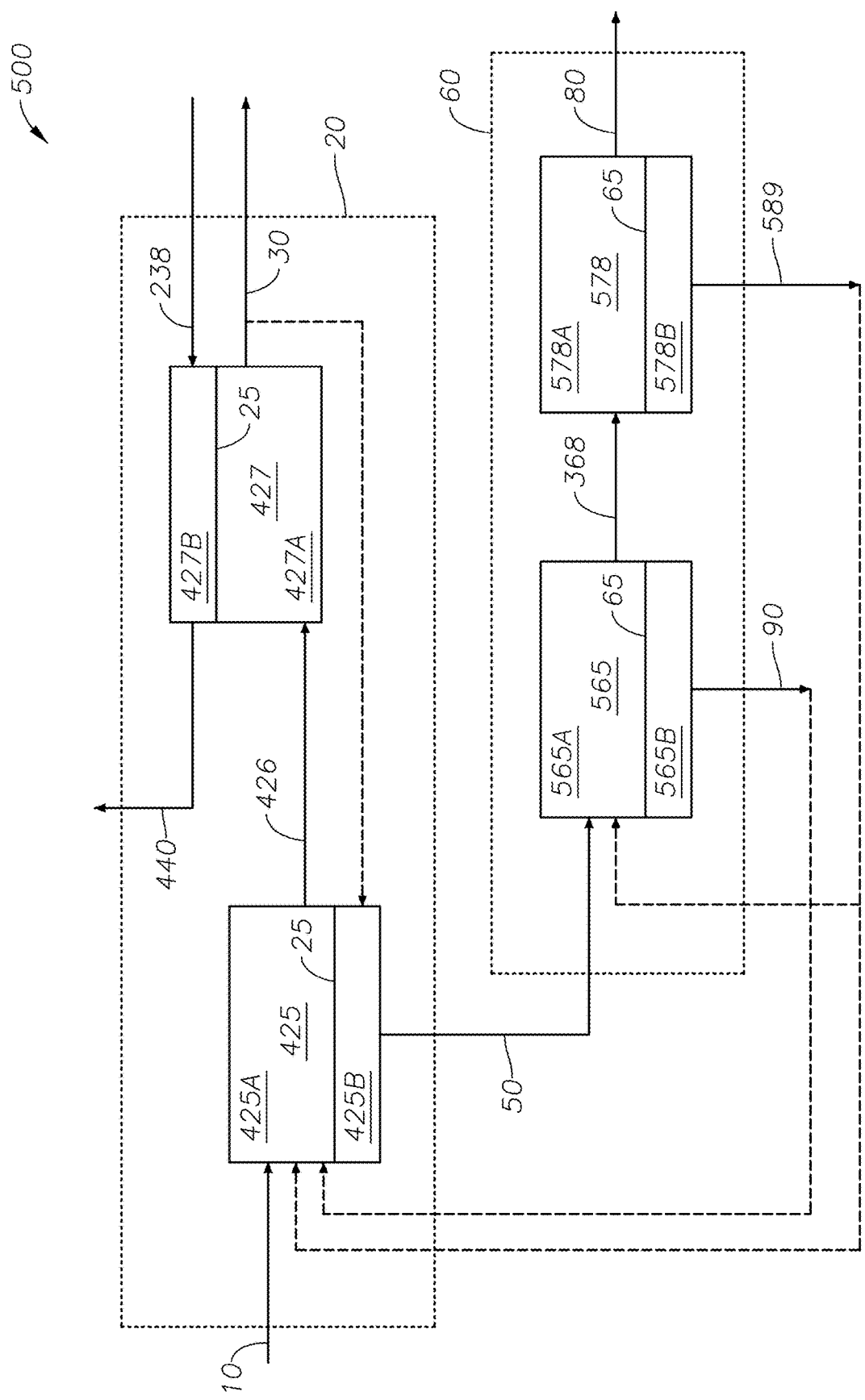
FIG. 5 is a block diagram showing an SO2 emissions management system with four membrane modules, according to an embodiment.

Referring to FIG. 5, SO2 emissions management system with four membrane modules 500 is shown. SO2 emissions stream 10 is introduced to SO2 removal system 20. SO2 removal system 20 includes first SO2 selective membrane unit 425 and second SO2 selective membrane unit 427. First SO2 selective membrane unit 425 includes SO2 selective membrane 25 which separates first SO2 selective membrane unit retentate side 425A and first SO2 selective membrane unit permeate side 425B. Second SO2 selective membrane unit 427 includes SO2 selective membrane 25 which separates second SO2 selective membrane unit retentate side 427A and second SO2 selective membrane unit permeate side 427B.

SO2 emissions stream 10 is introduced to first SO2 selective membrane unit retentate side 425A. SO2 selective membrane 25 selectively allows $SO_2$ to permeate the membrane. CO2 removal system feed stream 50 is removed from first SO2 selective membrane unit permeate side 425B and exits SO2 removal system 20. SO2 membrane retentate stream 426 is removed from first SO2 selective membrane unit retentate side 425A.

SO2 membrane retentate stream 426 is introduced to second SO2 selective membrane unit retentate side 427A. $SO_2$ preferentially permeates SO2 selective membrane 25 in second SO2 selective membrane unit 427. Air sweep 238 is introduced to second SO2 selective membrane unit permeate side 427B. SO2 membrane permeate stream 440 is removed to second SO2 selective membrane unit permeate side 427B. SO2 membrane permeate stream 440 contains $CO_2$, $SO_2$, water vapor, and additionally air. SO2 membrane permeate stream 440 exits SO2 removal system 20 and can be recycled to the sulfur recovery system. Since air sweep 238 is introduced to second SO2 selective membrane unit permeate side 427B, SO2 membrane permeate stream 440 contains air which can be used to substitute a portion of the air stream used in the sulfur recovery units such as the heaters or furnaces. Low SO2 discharge stream 30 is removed from second SO2 selective membrane unit retentate side 427A, and exits SO2 removal system 20. Alternately, a portion or all of the low SO2 discharge stream 30 can be used as a sweep for SO2 selective membrane 25 in first SO2 selective membrane unit 425 by introducing low SO2 discharge stream 30.

CO2 removal system feed stream 50 is introduced to CO2 removal system 60. CO2 removal system 60 includes first CO2 selective membrane unit 565 and second CO2 selective membrane unit 578. First CO2 selective membrane unit 565 includes CO2 selective membrane 65 which separates first CO2 selective membrane unit retentate side 565A and first CO2 selective membrane unit permeate side 565B. Second CO2 selective membrane unit 578 includes CO2 selective membrane 65 which separates second CO2 selective membrane unit retentate side 578A and second CO2 selective membrane unit permeate side 578B.

CO2 removal system feed stream 50 is introduced to first CO2 selective membrane unit retentate side 565A. $CO_2$ preferentially permeates CO2 selective membrane 65. CO2 membrane retentate stream 368 is removed from first CO2 selective membrane unit retentate side 565A. CO2 waste gas 90 is removed from first CO2 selective membrane unit permeate side 565B and exits CO2 removal system 60. CO2 waste gas 90 can be recycled to first SO2 selective membrane retentate side 425A to improve $SO_2$ recovery.

CO2 membrane retentate stream 368 is introduced to second CO2 selective membrane unit retentate side 578A of second CO2 selective membrane unit 578. $CO_2$ preferentially permeates CO2 selective membrane 65. CO2 membrane permeate stream 589 is removed from second CO2 selective membrane unit permeate side 578B and exits CO2 removal system 60. CO2 membrane permeate stream 589 has a higher concentration of $CO_2$ than CO2 membrane retentate stream 368. CO2 membrane permeate stream 589 can be recycled to first SO2 selective membrane unit retentate side 425A or can be recycled to first CO2 selective membrane unit retentate side 565A to improve $SO_2$ recovery. SO2 rich recycle 80 is removed from second CO2 selective membrane unit retentate side 578A and exits CO2 removal system 60. Additional compression can be provided to increase pressure of the streams being introduced to the membrane units.

Figure 6:
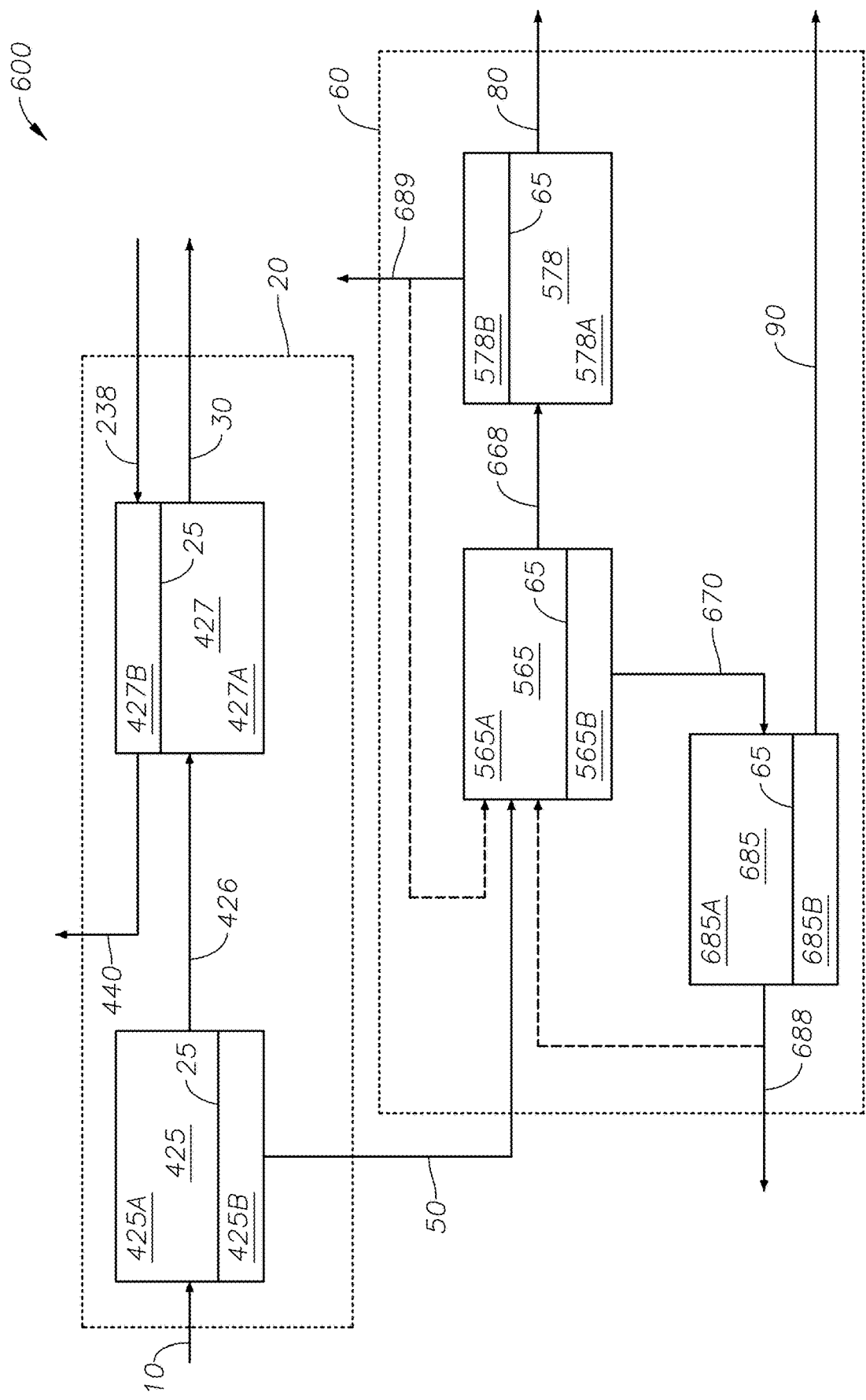
FIG. 6 is a block diagram showing an SO2 emissions management system with five membrane modules, according to an embodiment.

Referring to FIG. 6, SO2 emissions management system with five membrane modules 600 is shown. SO2 emissions stream 10 is introduced to SO2 removal system 20. SO2 removal system 20 includes first SO2 selective membrane unit 425 and second SO2 selective membrane unit 427, which are designed and arranged similarly to the arrangement in FIG. 5.

SO2 emissions stream 10 is introduced to first SO2 selective membrane unit retentate side 425A. SO2 selective membrane 25 selectively allows $SO_2$ to permeate the membrane. CO2 removal system feed stream 50 is removed from first SO2 selective membrane unit permeate side 425B and exits SO2 removal system 20. SO2 membrane retentate stream 426 is removed from first SO2 selective membrane unit retentate side 425A. SO2 membrane retentate stream 426 contains a lower concentration of $SO_2$ than SO2 emissions stream 10.

SO2 membrane retentate stream 426 is introduced to second SO2 selective membrane unit retentate side 427A. $SO_2$ preferentially permeates SO2 selective membrane 25 in second SO2 selective membrane unit 427. Air sweep 238 is introduced to second SO2 selective membrane unit permeate side 427B. SO2 membrane permeate stream 440 is removed to second SO2 selective membrane unit permeate side 427B. SO2 membrane permeate stream 440 exits SO2 removal system 20 and can be recycled to the sulfur recovery system. Since air sweep 238 is introduced to second SO2 selective membrane unit permeate side 427B SO2 membrane permeate stream 440 contains air which can be used to substitute a portion of the air stream used in the sulfur recovery units such as the heaters or furnaces. Low SO2 discharge stream 30 is removed from second SO2 selective membrane unit retentate side 427A, and exits SO2 removal system 20.

CO2 removal system feed stream 50 is introduced to CO2 removal system 60. CO2 removal system 60 includes first CO2 selective membrane unit 565, second CO2 selective membrane unit 578, and third CO2 selective membrane unit 685. First CO2 selective membrane unit 565 includes CO2 selective membrane 65 which separates first CO2 selective membrane unit retentate side 565A and first CO2 selective membrane unit permeate side 565B. Second CO2 selective membrane unit 578 includes CO2 selective membrane 65 which separates second CO2 selective membrane unit retentate side 578A and second CO2 selective membrane unit permeate side 578B. Third CO2 selective membrane unit 685 includes CO2 selective membrane 65 which separates third CO2 selective membrane unit retentate side 685A and third CO2 selective membrane unit permeate side 685B.

CO2 removal system feed stream 50 is introduced to first CO2 selective membrane unit retentate side 565A. $CO_2$ preferentially permeates CO2 selective membrane 65. First CO2 membrane selective permeate stream 670 is removed from first CO2 selective membrane permeate side 565B. First CO2 membrane selective permeate stream 670 has a higher concentration of $CO_2$ than CO2 removal system feed stream 50. First CO2 membrane retentate stream 668 is removed from first CO2 selective membrane unit retentate side 565A. First CO2 membrane retentate stream 668 has a lower concentration of $CO_2$ than CO2 removal system feed stream 50.

First CO2 membrane retentate stream 668 is introduced to second CO2 selective membrane unit retentate side 578A of second CO2 selective membrane unit 578. $CO_2$ preferentially permeates CO2 selective membrane 65. CO2 membrane permeate stream 689 is removed from second CO2 selective membrane unit permeate side 578B and exits CO2 removal system 60. CO2 membrane permeate stream 689 has a higher concentration of $CO_2$ than first CO2 membrane retentate stream 668. CO2 membrane permeate stream 689 can be recycled to first CO2 selective membrane unit retentate side 565A to improve $SO_2$ recovery. SO2 rich recycle 80 is removed from second CO2 selective membrane unit retentate side 578A and exits CO2 removal system 60.

First CO2 membrane permeate stream 670 is introduced to third CO2 selective membrane unit retentate side 685A of third CO2 selective membrane unit 685. $CO_2$ preferentially permeates CO2 selective membrane 65. CO2 waste gas 90 is removed from third CO2 selective membrane unit permeate side 685B and exits CO2 removal system 60. CO2 waste gas 90 contains a higher concentration of $CO_2$ than first CO2 membrane selective permeate stream 670. Third CO2 membrane retentate stream 688 is removed from third CO2 selective membrane unit retentate side 685A. Third CO2 membrane retentate stream 688 has a lower $CO_2$ concentration than first CO2 membrane permeate stream 670. Third CO2 membrane retentate stream 688 can be recycled to first CO2 selective membrane unit retentate side 565A to improve $SO_2$ recovery, or can exit CO2 removal system 60. Additional compression can be provided to increase pressure of the streams being introduced to the membrane units.

The addition of a vacuum or a compressor and vacuum on the permeate side of a membrane can result in an additional driving force for the separation of the components. The additional vacuum and compression provided on the permeate sides of the membrane modules in the system allow for a reduction of required membrane surface area and increased $SO_2$ recovery. The vacuum or compressor used on the permeate side of a membrane module can be any type of vacuum or compressor used to generate a vacuum (less than atmospheric pressure) on a feed stream or used to increase the pressure of the produced stream (greater than atmospheric pressure). Types of vacuum generators that can be used include vacuum pumps, such as gas transfer vacuum pumps like diaphragm pumps or rotary piston pumps. Types of compressors that can be used include reciprocating, rotary, centrifugal, and axial compressors.

Figure 7:
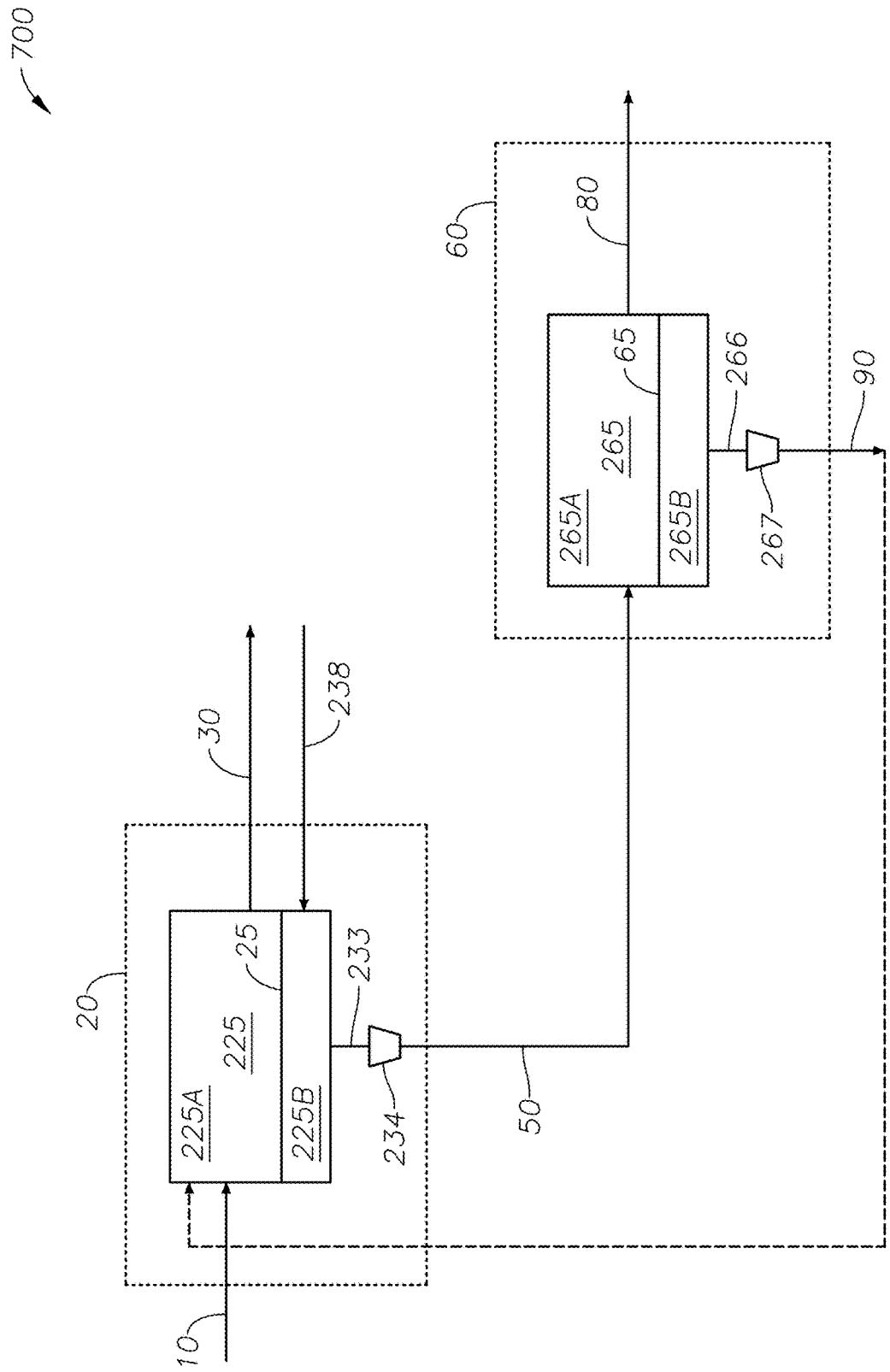
FIG. 7 is a block diagram showing an SO2 emissions management system with single membrane modules and additional vacuum, according to an embodiment.

Referring to FIG. 7, SO2 emissions management system with single membrane modules and additional vacuum 700 is shown. SO2 removal system 20 depicted in FIG. 7 shares the same streams and components as SO2 removal system 20 depicted in FIG. 2; however, SO2 selective membrane permeate vacuum stream 233 is generated from SO2 selective membrane unit permeate side 225B. SO2 selective membrane permeate vacuum stream 233 is introduced to SO2 selective membrane vacuum 234. SO2 selective membrane vacuum 234 can be any type of vacuum or compressor discussed herein. CO2 removal system feed stream 50 is generated from SO2 selective membrane vacuum 234. CO2 removal system feed stream 50 has a higher pressure than SO2 selective membrane permeate vacuum stream 233.

CO2 removal system 60 depicted in FIG. 7 shares the same streams and components as CO2 removal system 60 depicted in FIG. 2; however, CO2 selective membrane permeate vacuum stream 266 is generated from CO2 selective membrane unit permeate side 265B. CO2 selective membrane permeate vacuum stream 266 is introduced to CO2 selective membrane vacuum 267. CO2 selective membrane vacuum 267 can be any type of vacuum or compressor discussed herein. CO2 waste gas 90 is generated from CO2 selective membrane vacuum 267. CO2 waste gas 90 has a higher pressure than CO2 selective membrane permeate vacuum stream 266. Additional compression can be provided to increase pressure of the streams being introduced to the membrane modules Referring to FIG. 8, SO2 emissions management system with double membrane modules for CO2 removal and additional vacuum 800. SO2 removal system 20 depicted in FIG. 8 shares the same streams and components as SO2 removal system 20 depicted in FIG. 7, with an additional recycle of polishing SO2 selective membrane retentate stream 378 to SO2 selective membrane unit retentate side 225A.

Figure 8:
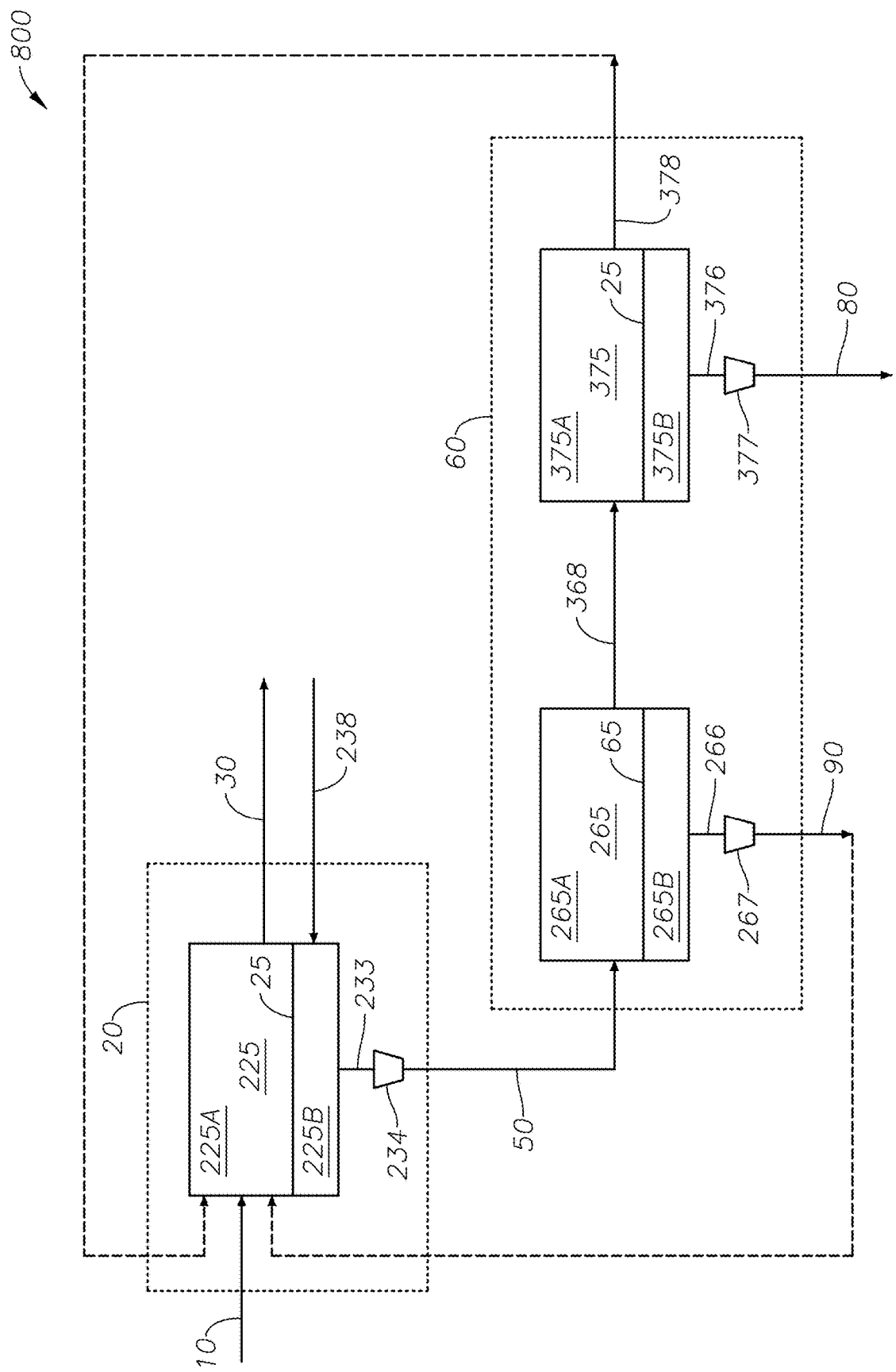
FIG. 8 is a block diagram showing an SO2 emissions management system with double membrane modules for $CO_2$ removal and additional vacuum, according to an embodiment.

CO2 removal system 60 depicted in FIG. 8 shares the same streams and components as CO2 removal system 60 depicted in FIG. 3; however, additional vacuum has been provided on the permeate sides of the membranes. CO2 selective membrane permeate vacuum stream 266 is generated from CO2 selective membrane unit permeate side 265B. CO2 selective membrane permeate vacuum stream 266 is introduced to CO2 selective membrane vacuum 267. CO2 selective membrane vacuum 267 can be any type of vacuum or compressor discussed herein. CO2 waste gas 90 is generated from CO2 selective membrane vacuum 267. CO2 waste gas 90 has a higher pressure than CO2 selective membrane permeate vacuum stream 266. Polishing SO2 membrane permeate vacuum stream 376 is generated from polishing SO2 selective membrane unit permeate side 375B. Polishing SO2 membrane permeate vacuum stream 376 is introduced to polishing SO2 selective membrane vacuum 377. Polishing SO2 selective membrane vacuum 377 can be any type of vacuum or compressor discussed herein. SO2 rich recycle 80 is generated from polishing SO2 selective membrane vacuum 377. SO2 rich recycle 80 has a higher pressure than polishing SO2 membrane permeate vacuum stream 376. Additional compression can be provided to increase pressure of the streams being introduced to the membrane modules.

Figure 9:
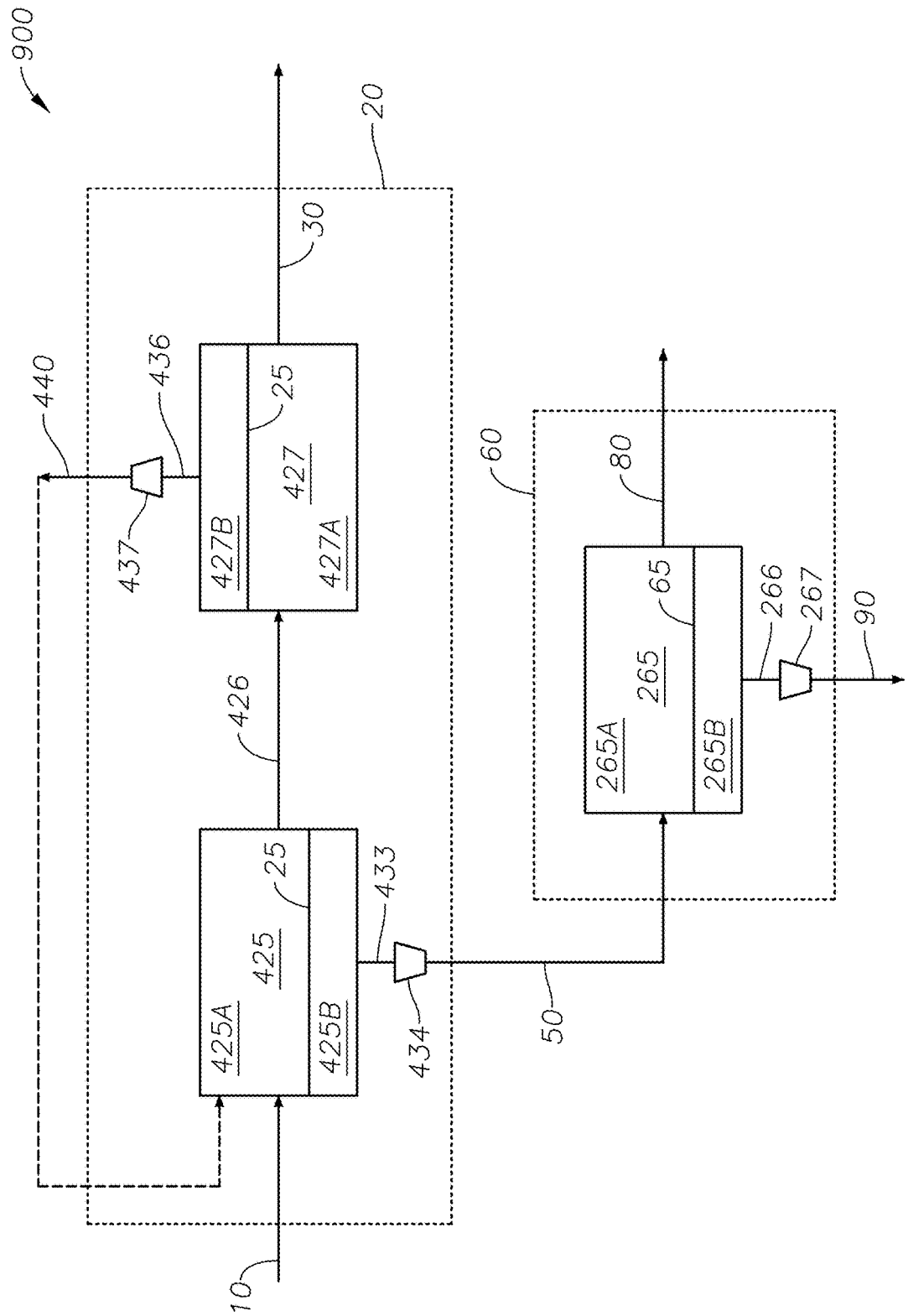
FIG. 9 is a block diagram showing an SO2 emissions management system with double membrane modules for $SO_2$ removal and additional vacuum, according to an embodiment.

Referring to FIG. 9, SO2 emissions management system with double membrane modules for SO2 removal and additional vacuum 900 is shown. SO2 removal system 20 depicted in FIG. 9 shares the same streams and components as SO2 removal system 20 depicted in FIG. 4; however, additional vacuum has been provided on the permeate sides of the membranes. First SO2 selective membrane permeate vacuum stream 433 is generated from first SO2 selective membrane unit permeate side 425B. First SO2 selective membrane permeate vacuum stream 433 is introduced to first SO2 selective membrane vacuum 434. First SO2 selective membrane vacuum 434 can be any type of vacuum or compressor discussed herein. CO2 removal system feed stream 50 is generated from first SO2 selective membrane vacuum 434. CO2 removal system feed stream 50 has a higher pressure than first SO2 selective membrane vacuum stream 433. Second SO2 selective membrane permeate vacuum stream 436 is generated from second SO2 selective membrane unit permeate side 427B. Second SO2 selective membrane permeate vacuum stream 436 is introduced to second SO2 selective membrane vacuum 437. Second SO2 selective membrane vacuum 437 can be any type of vacuum or compressor discussed herein. SO2 membrane permeate stream 440 is generated from second SO2 selective membrane vacuum 437. SO2 membrane permeate stream 440 has a higher pressure than second SO2 selective membrane permeate vacuum stream 436.

CO2 removal system 60 depicted in FIG. 9 shares the same streams and components as CO2 removal system 60 depicted in FIG. 7; however, the optional recycle of CO2 waste gas 90 to first SO2 selective membrane unit retentate side 425A is not provided. Additional compression can be provided to increase pressure of the streams being introduced to the membrane modules.

Figure 10:
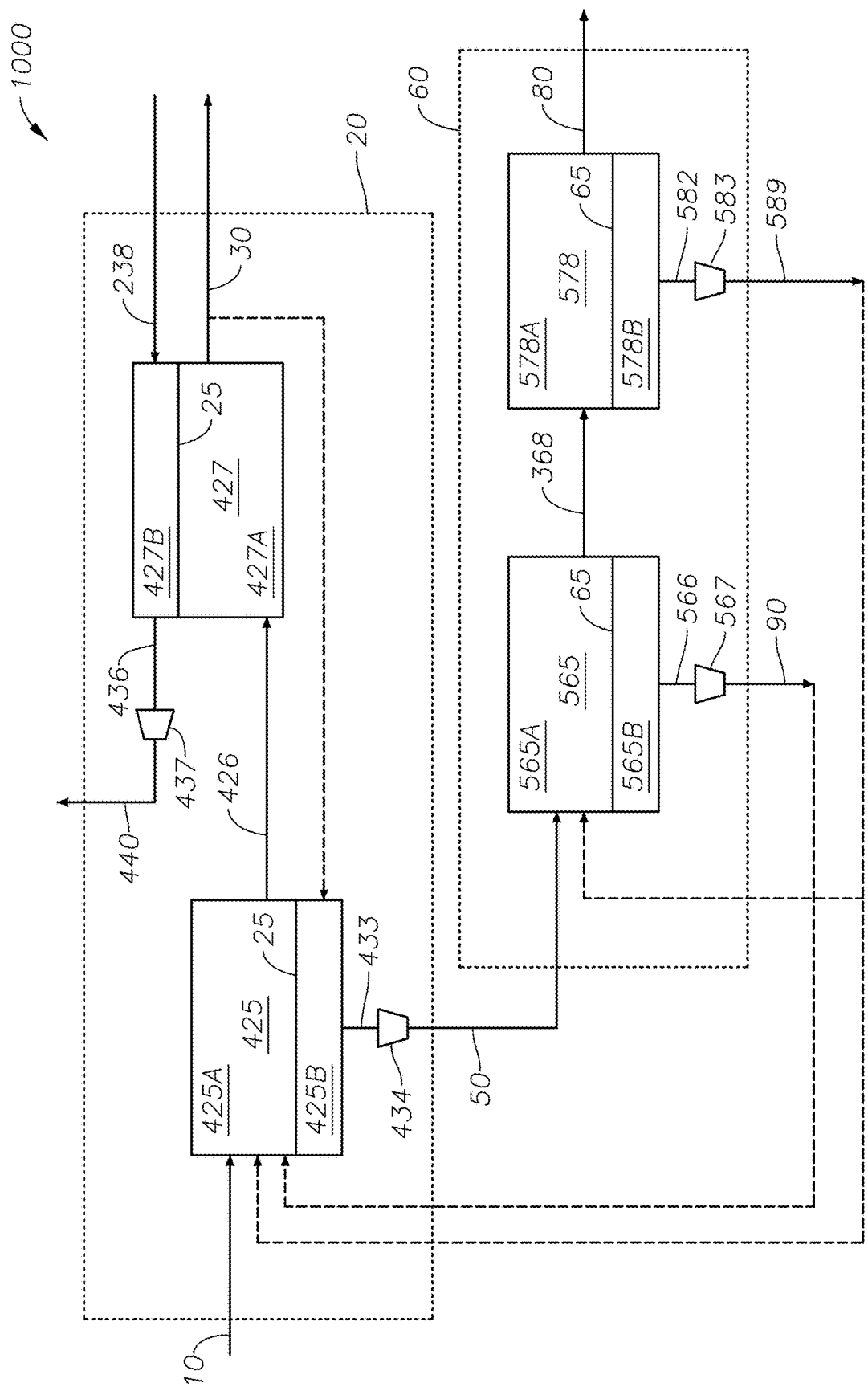
FIG. 10 is a block diagram showing an SO2 emissions management system with four membrane modules and additional vacuum, according to an embodiment.

Referring to FIG. 10, SO2 emissions management system with four membrane modules and additional vacuum 1000 is shown. SO2 removal system 20 depicted in FIG. 10 shares the same streams and components as SO2 removal system 20 depicted in FIG. 5; however, additional vacuum has been provided on the permeate sides of the membranes. First SO2 selective membrane permeate vacuum stream 433 is generated from first SO2 selective membrane unit permeate side 425B. First SO2 selective membrane permeate vacuum stream 433 is introduced to first SO2 selective membrane vacuum 434. First SO2 selective membrane vacuum 434 can be any type of vacuum or compressor discussed herein. CO2 removal system feed stream 50 is generated from first SO2 selective membrane vacuum 434. CO2 removal system feed stream 50 has a higher pressure than first SO2 selective membrane vacuum stream 433. Second SO2 selective membrane permeate vacuum stream 436 is generated from second SO2 selective membrane unit permeate side 427B. Second SO2 selective membrane permeate vacuum stream 436 is introduced to second SO2 selective membrane vacuum 437. Second SO2 selective membrane vacuum 437 can be any type of vacuum or compressor discussed herein. SO2 membrane permeate stream 440 is generated from second SO2 selective membrane vacuum 437. SO2 membrane permeate stream 440 has a higher pressure than second SO2 selective membrane permeate vacuum stream 436.

CO2 removal system 60 depicted in FIG. 10 shares the same streams and components as CO2 removal system 60 depicted in FIG. 5; however, additional vacuum has been provided on the permeate sides of the membranes. First CO2 selective membrane permeate vacuum stream 566 is generated from first CO2 selective membrane unit permeate side 565B. First CO2 selective membrane permeate vacuum stream 566 is introduced to first CO2 selective membrane vacuum 567. First CO2 selective membrane vacuum 567 can be any type of vacuum or compressor discussed herein. CO2 waste gas 90 is generated from first CO2 selective membrane vacuum 567. CO2 waste gas 90 has a higher pressure than first CO2 selective membrane permeate vacuum stream 566. Second CO2 selective membrane permeate vacuum stream 582 is generated from second CO2 selective membrane unit permeate side 578B. Second CO2 selective membrane permeate vacuum stream 582 is introduced to second CO2 selective membrane vacuum 583. Second CO2 selective membrane vacuum 583 can be any type of vacuum or compressor discussed herein. CO2 membrane permeate stream 589 is generated from second CO2 selective membrane vacuum 583. CO2 membrane permeate stream 589 has a higher pressure than second CO2 selective membrane permeate vacuum stream 582. Additional compression can be provided to increase pressure of the streams being introduced to the membrane modules.

Figure 11:
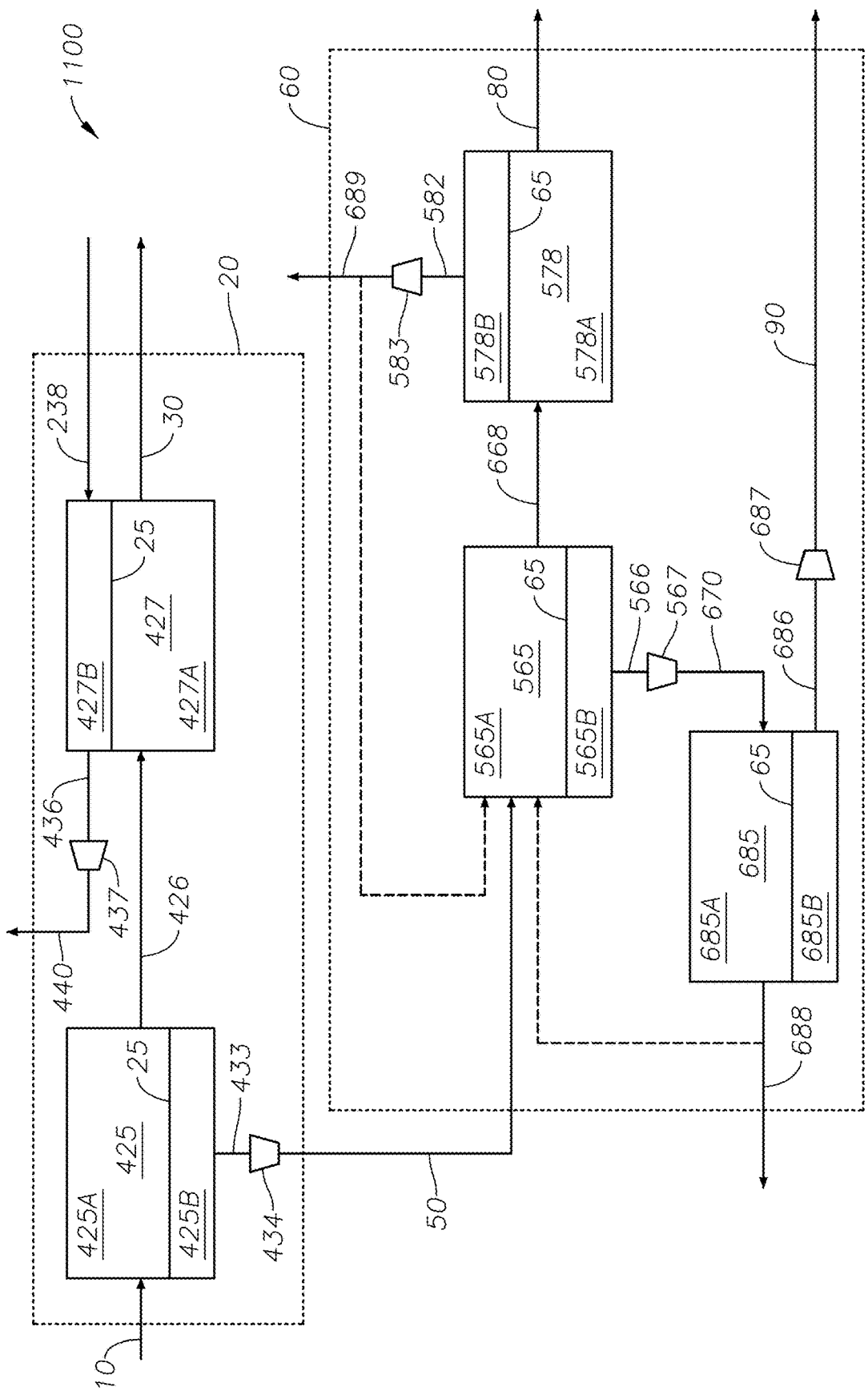
FIG. 11 is a block diagram showing an SO2 emissions management system with five membrane modules and additional vacuum, according to an embodiment.

Referring to FIG. 11, SO2 emissions management system with five membrane modules and additional vacuum 1100 is shown. SO2 removal system 20 depicted in FIG. 11 shares the same streams and components as SO2 removal system 20 depicted in FIG. 10; however, low SO2 discharge stream 30 is not shown as being optionally recycled to first SO2 selective membrane unit permeate side 425B.

CO2 removal system 60 depicted in FIG. 11 shares the same streams and components as CO2 removal system 60 depicted in FIG. 6; however, additional vacuum has been provided on the permeate sides of the membranes. First CO2 selective membrane permeate vacuum stream 566 is generated from first CO2 selective membrane unit permeate side 565B. First CO2 selective membrane permeate vacuum stream 566 is introduced to first CO2 selective membrane vacuum 567. First CO2 selective membrane vacuum 567 can be any type of vacuum or compressor discussed herein. First CO2 membrane permeate stream 670 is generated from first CO2 selective membrane vacuum 567. First CO2 membrane permeate stream 670 has a higher pressure than first CO2 selective membrane permeate vacuum stream 566. Second CO2 selective membrane permeate vacuum stream 582 is generated from second CO2 selective membrane unit permeate side 578B. Second CO2 selective membrane permeate vacuum stream 582 is introduced to second CO2 selective membrane vacuum 583. Second CO2 selective membrane vacuum 583 can be any type of vacuum or compressor discussed herein. Second CO2 membrane permeate stream 689 is generated from second CO2 selective membrane vacuum 583.

EXAMPLES

Process simulations were performed using computer software to illustrate potential operations of the methods and systems disclosed herein.

Examples 1, 2, and 3 show that when using only an SO2 selective membrane, significant amounts of $CO_2$ are still captured in the SO2 rich recycle 80 being directed back to the sulfur recovery unit. Additional reductions in $CO_2$ amounts recycled to the sulfur recovery units are needed to improve efficiency and prevent upsets, which supports the need of the additional $CO_2$ removal system of the methods and systems disclosed herein.

Example 1

As a comparative example, a process simulation was performed utilizing a membrane unit including an SO2 selective membrane. The SO2 selective membrane used in this example has the characteristics as shown in Table 4, below.

TABLE 4

| SO2 Selective Membrane Properties | | | | | |
|---|---|---|---|---|---|
| | $SO_2$ | $CO_2$ | $N_2$ | $O_2$ | $H_2O$ |
| Membrane Permeance (gpu) | 2,000 | 200 | 20 | 40 | 5,000 |
| Selectivity | $SO_2/N_2 = 100$ | $SO_2/CO_2 = 10$ | $CO_2/N_2 = 10$ | $SO_2/O_2 = 20$ | $SO_2/H_2O = 0.4$ |

Figure 12:
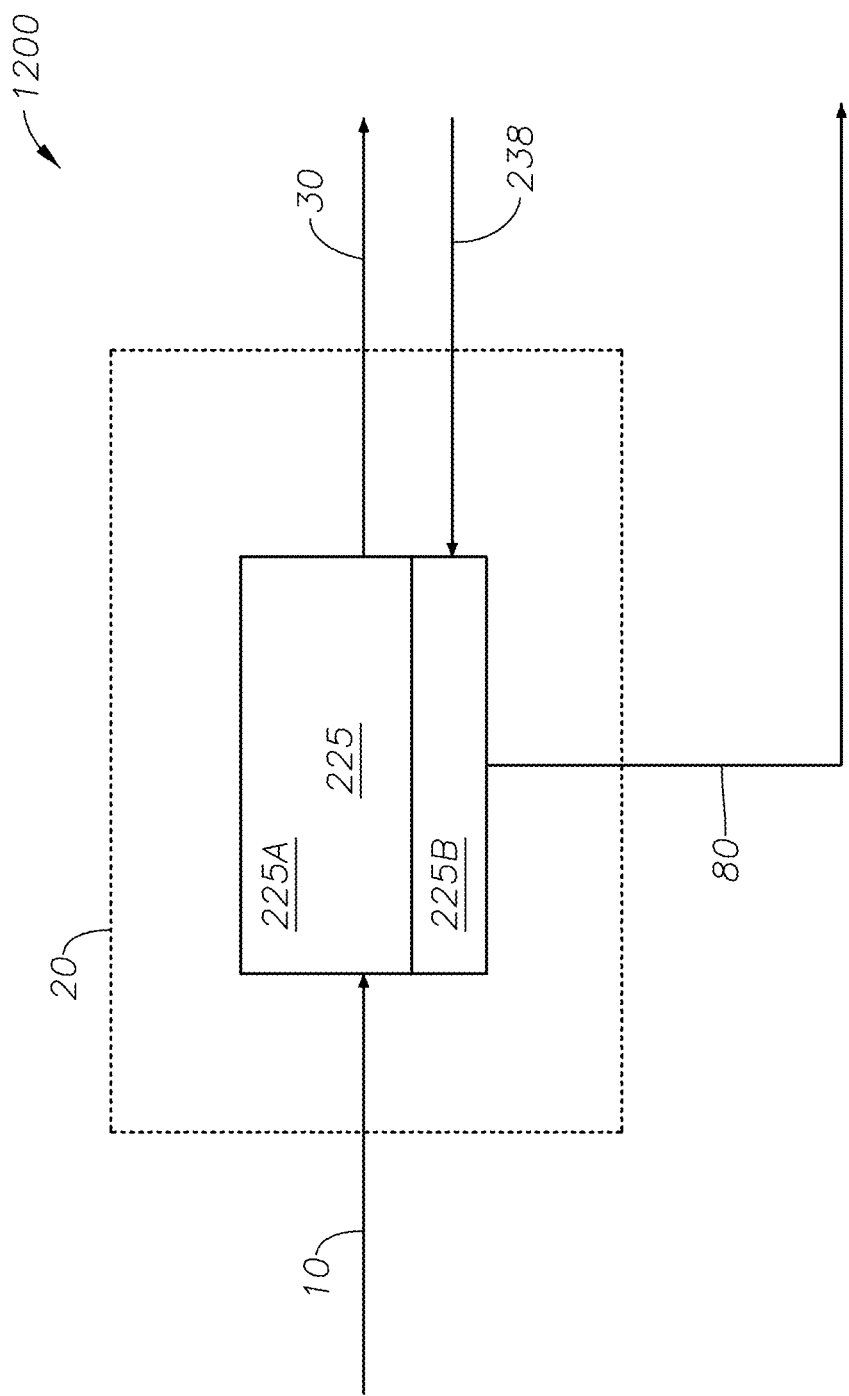
FIG. 12 is a block diagram of an SO2 emissions management system with a single SO2 selective membrane for comparison purposes.

The process simulation was set up to represent a configuration as shown in FIG. 12. FIG. 12 shows the SO2 emissions stream 10 being introduced to the SO2 removal system 20. The SO2 removal system 20 includes the SO2 selective membrane unit 225. The low SO2 discharge stream 30 is generated from the retentate side of the SO2 selective membrane unit 225. The air sweep 238 is introduced to the permeate side of the SO2 selective membrane. The permeate from the SO2 selective membrane unit 225 is the SO2 rich recycle 80.

The process simulation was performed with the air sweep 238 flow rate set equal to the SO2 emissions stream 10. The area of the SO2 selective membrane in the SO2 selective membrane unit 225 was adjusted until the $SO_2$ concentration in the low SO2 discharge stream 30 was 50 ppm $SO_2$. The resulting membrane area was 4,350 m². No compression or vacuum was used. The results of the process simulation are shown in Table 5.

TABLE 5

Example 1 Results

| Stream Number | | 10 | 30 | 238 | 80 |
|---|---|---|---|---|---|
| Composition | $SO_2$ | 0.1 | 50 ppm | — | 0.083 |
| (mol %) | $CO_2$ | 35.0 | 19.7 | — | 15.9 |
| | $N_2$ | 60.9 | 72.7 | 79.0 | 67.9 |
| | $O_2$ | 4.0 | 7.6 | 21.0 | 16.1 |
| Flow (mmscfd) | | 2.0 | 1.7 | 2.0 | 2.3 |
| Pressure (bar) | | 1.0 | 1.0 | 1.0 | 1.0 |

The results of Example 1 show that although 95% of the $SO_2$ is removed from the SO2 emissions stream 10 to the SO2 rich recycle 80, an additional 52% of the $CO_2$ content also was disposed in the $SO_2$ rich recycle 80, resulting in a significant amount of $CO_2$ that could result in operational upsets and difficulties in the sulfur recovery units if recycled.

Example 2

Another process simulation was performed utilizing the same membrane unit setup and same membrane characteristics as in Example 1, except that additional compression was provided on the SO2 emissions stream 10 so that the pressure was higher. The pressure increased from 1.0 bar to 6.0 bar.

Similar to in Example 1, the area of the SO2 selective membrane in the SO2 selective membrane unit 225 was adjusted until the $SO_2$ concentration in the low SO2 discharge stream 30 was 50 ppm $SO_2$. The resulting required membrane area was 244 m². The theoretical power that would have been supplied to a compressor necessary to raise the pressure of the SO2 emissions stream 10 was calculated to be 167 kWe. The results of the process simulation are shown in Table 6.

TABLE 6

Example 2 Results

| Stream Number | | 10 | 30 | 238 | 80 |
|---|---|---|---|---|---|
| Composition | $SO_2$ | 0.1 | 50 ppm | — | 0.085 |
| (mol %) | $CO_2$ | 35.0 | 28.2 | — | 9.1 |
| | $N_2$ | 60.9 | 67.3 | 79.0 | 72.0 |
| | $O_2$ | 4.0 | 4.5 | 21.0 | 18.8 |
| Flow (mmscfd) | | 2.0 | 1.8 | 2.0 | 2.2 |
| Pressure (bar) | | 6.0 | 6.0 | 1.0 | 1.0 |

The addition of raising the pressure of the SO2 emissions stream 10 with a compressor results in a 0.1 mmscfd in the SO2 rich recycle 80 as compared to Example 1 and a 4,095 m² required membrane area decrease as compared to Example 1. Additionally, the compression produced a useful reduction in $CO_2$ recycled from 52% to 29%.

Example 3

Another process simulation was performed utilizing the same membrane unit setup, including compression, and same membrane characteristics as in Example 2, except that the air sweep 238 was reduced to 0.2 mmscfd instead of matching the gas flow rate of the SO2 emissions stream 10. Sweep ratios (sweep gas flow/feed gas flow) of 0.1 to 0.2 produce a large reduction in membrane area as compared to no sweep flow.

Similar to in Example 1, the area of the SO2 selective membrane in the SO2 selective membrane unit 225 was adjusted until the SO2 concentration in the low SO2 discharge stream 30 was 50 ppm $SO_2$. The resulting required membrane area was 511 m². The theoretical power that would have been supplied to a compressor necessary to raise the pressure of the SO2 emissions stream 10 was calculated to be 167 kWe. The results of the process simulation are shown in Table 7.

TABLE 7

Example 3 Results

| Stream Number | | 10 | 30 | 238 | 80 |
|---|---|---|---|---|---|
| Composition | $SO_2$ | 0.1 | 50 ppm | — | 0.319 |
| (mol %) | $CO_2$ | 35.0 | 24.0 | — | 52.8 |
| | $N_2$ | 60.0 | 71.4 | 79.0 | 38.9 |
| | $O_2$ | 4.0 | 4.6 | 21.0 | 8.0 |
| Flow (mmscfd) | | 2.0 | 1.6 | 0.2 | 0.6 |
| Pressure (bar) | | 6.0 | 6.0 | 1.0 | 1.0 |

Example 4

Examples 1-3 above show that even with separation, significant amounts of CO2 are recycled to the Claus furnace. The following examples utilize both $CO_2$ and $SO_2$ selective membranes used together to reduce the $CO_2$ recycled to the SRU.

In example 4, the set up in FIG. 7 was used as the basis for the simulation. The air sweep ratio for the SO2 selective membrane in the SO2 selective membrane unit 225 was set at 0.1 on the permeate side of the membrane. The membrane area of the SO2 selective membrane in the SO2 selective membrane unit 225 was calculated to meet the requirements of the SO2 concentration of 50 ppm in low SO2 discharge stream 30.

The SO2 selective membrane simulated in the computer model was a PEBAX™ 4011 composite membrane with the properties as described in the following Table 8.

TABLE 8

Permeation Properties of PEBAX™ 4011 Composite Membrane

| Gas | Flux | Selectivity over $N_2$ |
|---|---|---|
| $N_2$ | 5.0 gpu | 1 |
| $O_2$ | 11 gpu | 2.2 |
| $CO_2$ | 280 gpu | 56 |
| $SO_2$ | 3,500 gpu | 700 |

The CO2 selective membrane simulated in the computer model was a perfluoropolymer membrane with the properties as described in the following Table 9.

TABLE 9

Permeation Properties of $CO_2/SO_2$ Selective Membrane

| | $SO_2$ | $CO_2$ | $N_2$ | $O_2$ | $H_2O$ |
|---|---|---|---|---|---|
| Permeance (gpu) | 50 | 500 | 20 | 40 | 2,000 |
| Selectivity | $SO_2/N_2 =$ 2.5 | $CO_2/N_2 =$ 25 | $CO_2/SO_2 =$ 10 | $SO_2/O_2 =$ 1.25 | $H_2O/SO_2 =$ 40 |

The operational conditions for the simulation were as follows. The air sweep ration for the SO2 selective membrane was set at 0.1. The optional recycle of CO2 waste gas 90 was sent to SO2 selective membrane unit retentate side 225A. In this example, the SO2 selective membrane vacuum 234 was a compressor that generated CO2 removal system feed stream 50 at a pressure of 9 bar, and the CO2 selective membrane vacuum 267 was a compressor that generated CO2 waste gas 90 at a pressure of 6.0 bar for recycle.

The results of the simulation are shown in the following Table 10.

TABLE 10

| | Example 4 Results | | | | | | | |
|---|---|---|---|---|---|---|---|---|
| Stream Number | | 10 | 30 | 238 | 233 | 50 | 90 | 80 |
| Composition | $SO_2$ | 0.096 | 50 ppm | — | 0.374 | 0.374 | 0.227 | 0.766 |
| (Mol %) | $CO_2$ | 61.4 | 34.6 | — | 67.4 | 67.4 | 88.7 | 10.0 |
| | $N_2$ | 35.2 | 60.8 | 79.0 | 26.6 | 26.6 | 8.1 | 76.5 |
| | $O_2$ | 4.6 | 4.6 | 21.0 | 5.6 | 5.6 | 2.9 | 12.8 |
| Flow (mmscfd) | | 2.67 | 1.95 | 0.2 | 0.91 | 0.91 | 0.67 | 0.25 |
| Pressure (bar) | | 6.0 | 6.0 | 1.0 | 1.0 | 9 | 6.0 | 6.0 |

The membrane area of the SO2 selective membrane was calculated to be 700 m². The membrane area for the CO2 selective membrane was calculated to be 384 m². The calculated power required for SO2 selective membrane vacuum 234 was 219 kWe, and the calculated power required for CO2 selective membrane vacuum 267 was 74 kWe.

SO2 rich recycle 80 has a very low flow rate with very little $CO_2$ concentration, and so can be easily incorporated into the recycle to the sulfur recovery unit. The results of this example show that only 3.6% of the $CO_2$ was recycled in SO2 rich recycle 80, and SO2 rich recycle 80 was only 12.5% of the original emissions stream, SO2 emissions stream 10.

Example 5

In Example 5, the set up in FIG. 8 was used as the basis for the simulation with additional compression between the membrane modules, with all recycles active. The SO2 selective membrane used in this example has the same properties as the SO2 selective membrane used in Example 4. The CO2 selective membrane used in this example has the same properties as the CO2 selective membrane used in Example 4. The air sweep ratio for the SO2 selective membrane in SO2 selective membrane unit 225 was set at 0.1 on the permeate side of the membrane. The membrane area of the SO2 selective membrane in the SO2 selective membrane unit 225 was calculated to meet the requirements of the SO2 concentration of 50 ppm in low SO2 discharge stream 30.

The results of the computer simulation are shown in the table below:

TABLE 11

| | Example 5 Results | | | | | | | | |
|---|---|---|---|---|---|---|---|---|---|
| Stream Number | | 10 | 30 | 238 | 233 | 50 | 266 | 376 | 368 | 378 |
| Composition | $SO_2$ | 0.1 | 50 ppm | — | 0.558 | 0.558 | 0.410 | 10.0 | 1.121 | 0.327 |
| (Mol %) | $CO_2$ | 35 | 31.9 | — | 69.3 | 69.3 | 86.2 | 21.2 | 5.0 | 3.5 |
| | $N_2$ | 60.9 | 62.6 | 79.0 | 24.9 | 24.9 | 10.0 | 53.5 | 81.6 | 84.1 |
| | $O_2$ | 4.0 | 5.5 | 21.0 | 5.3 | 5.3 | 3.4 | 15.3 | 12.3 | 12.1 |
| Flow (mmscfd) | | 2.0 | 2.2 | 0.2 | 1.1 | 1.1 | 0.88 | 0.02 | 0.23 | 0.21 |
| Pressure (bar) | | 6.0 | 6.0 | 1.0 | 1.0 | 6.0 | 1.0 | 1.0 | 20 | 20 |

The membrane area for the membrane in SO2 selective membrane unit 225 was calculated to be 924 m². The membrane area for the membrane in CO2 selective membrane unit 265 was calculated to be 590 m². The membrane area for the membrane in polishing SO2 selective membrane unit 375 was calculated to be 14 m². The calculated power required for SO2 selective membrane vacuum 234 was 90 kWe, and additional compressors were calculated to require 253 kWe and 12 kWe. The additional compression between membrane modules was used to increase the pressure feed. SO2 rich recycle 80 had the same composition as polishing SO2 membrane permeate vacuum stream 376. SO2 rich recycle 80 has 10 mol % $SO_2$ and 15 mol % $O_2$, so the impact of the recycle on the sulfur recovery unit was minimal.

Although the present disclosure has been described in detail, it should be understood that various changes, substitutions, and alterations can be made without departing from the principle and scope of the disclosure. Accordingly, the scope of the present disclosure should be determined by the following claims and their appropriate legal equivalents.

The singular forms "a," "an," and "the" include plural referents, unless the context clearly dictates otherwise.

Optional or optionally means that the subsequently described event or circumstances can or may not occur. The description includes instances where the event or circumstance occurs and instances where it does not occur.

Ranges may be expressed throughout as from about one particular value, or to about another particular value. When such a range is expressed, it is to be understood that another embodiment is from the one particular value or to the other particular value, along with all combinations within said range.

As used in the specification and in the appended claims, the words "comprise," "has," "contain" and "include" and all grammatical variations thereof are each intended to have an open, non-limiting meaning that does not exclude additional elements or steps.

As used throughout the specification and claims, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present disclosure.

What is claimed is:

1. A method for processing sulfur dioxide emissions from a sulfur removal unit for improved operating conditions when treated streams are recycled to the sulfur removal unit, the method comprising the steps of:
   introducing an $SO_2$ emissions stream to an $SO_2$ removal system, the $SO_2$ removal system comprising an $SO_2$ selective membrane, operable to separate sulfur dioxide and carbon dioxide, wherein the $SO_2$ emissions stream is saturated with water and further comprises sulfur dioxide and carbon dioxide;
   separating sulfur dioxide and carbon dioxide in the $SO_2$ removal system by the $SO_2$ selective membrane;
   generating a $CO_2$ removal system feed stream from the $SO_2$ removal system;
   generating a low $SO_2$ discharge stream from the $SO_2$ removal system;
   introducing the $CO_2$ removal system feed stream to a $CO_2$ removal system, the $CO_2$ removal system comprising a $CO_2$ selective membrane, operable to separate carbon dioxide and sulfur dioxide;
   separating carbon dioxide and sulfur dioxide in the $CO_2$ removal system by the $CO_2$ selective membrane;
   generating an $SO_2$ rich recycle derived from the $CO_2$ removal system, such that the $SO_2$ rich recycle has a higher concentration of sulfur dioxide than the $SO_2$ emissions stream, and further such that the $SO_2$ rich recycle has a lower concentration of carbon dioxide than the $SO_2$ emissions stream; and
   generating a $CO_2$ waste gas from the $CO_2$ removal system.

2. The method of claim 1, further comprising the step of recycling the $SO_2$ rich recycle to the sulfur removal unit, such that the introduction of the $SO_2$ rich recycle to the sulfur removal unit allows for additional sulfur recovery while assisting in maintaining a proper temperature profile in the sulfur removal unit due to the lower concentration of carbon dioxide in the $SO_2$ rich recycle, and further such that an amount of a fuel gas introduced to the sulfur removal unit is reduced.

3. The method of claim 1, wherein the $SO_2$ emissions stream is generated from a combustion device in the sulfur removal unit.

4. The method of claim 1, wherein the sulfur removal unit is selected from the group consisting of: a Claus plant, a sulfur scrubber, a metallurgical smelting process, a FCC catalyst regeneration process, and combinations of the same.

5. The method of claim 1, wherein the low $SO_2$ discharge stream comprises less than 150 ppm sulfur dioxide.

6. The method of claim 1, wherein the low $SO_2$ discharge stream comprises less than 100 ppm sulfur dioxide.

7. The method of claim 1, wherein the $SO_2$ removal system comprises a rubbery polar membrane.

8. The method of claim 1, wherein the $CO_2$ selective membrane comprises a perfluoropolymer.

9. The method of claim 8, wherein the perfluoropolymer is a monomer, copolymer, block copolymer, terpolymer, or block terpolymer generated by a combination of monomers selected from the group of monomers: having the chemical structure

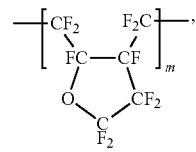

where m is repeated to generate the perfluoropolymer polymer material; having the chemical structure

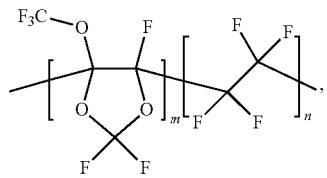

where m or n is repeated to generate the perfluoropolymer; having the chemical structure

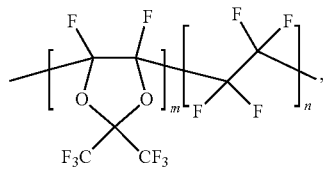

where m or n is repeated to generate the perfluoropolymer; perfluoro(2-methylene-4,5-dimethyl-1,3-dioxolane); perfluoro(2-methylene-1,3-dioxolane); perfluoro-2,2-dimethyl-1,3-dioxole (PDD); and perfluoro-3-butenyl-vinyl ether (PBVE).

10. The method of claim 8, wherein the perfluoropolymer is a homopolymer, a copolymer, a block copolymer, a terpolymer, a block terpolymer, or any other combination of the monomers selected from the group of monomers consisting of:

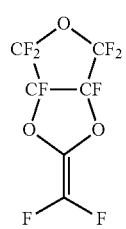

A

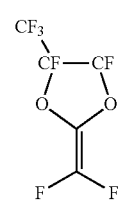

B

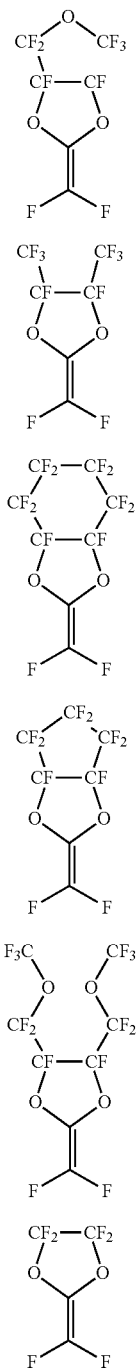

and combinations of the same.

11. The method of claim 1, wherein the $SO_2$ removal system comprises an $SO_2$ selective membrane unit, the $SO_2$ selective membrane unit comprising an $SO_2$ selective membrane unit retentate side and an $SO_2$ selective membrane unit permeate side, and the $CO_2$ removal system comprises a $CO_2$ selective membrane unit, the $CO_2$ selective membrane unit comprising a $CO_2$ selective membrane unit retentate side and a $CO_2$ selective membrane unit permeate side, and the method further comprising the steps of:
introducing the $SO_2$ emissions stream to the $SO_2$ selective membrane unit retentate side, the $SO_2$ selective membrane unit operable to allow sulfur dioxide to permeate the $SO_2$ selective membrane in preference to carbon dioxide;
causing sulfur dioxide to pass through the $SO_2$ selective membrane in the $SO_2$ selective membrane unit to produce the $CO_2$ removal system feed stream from the $SO_2$ selective membrane unit permeate side;
removing the low $SO_2$ discharge stream from the $SO_2$ selective membrane unit retentate side;
introducing the $CO_2$ removal system feed stream to the $CO_2$ selective membrane unit retentate side, the $CO_2$ selective membrane unit operable to allow carbon dioxide to permeate the $CO_2$ selective membrane in preference to sulfur dioxide;
causing the carbon dioxide to pass through the $CO_2$ selective membrane in the $CO_2$ selective membrane unit to produce the $CO_2$ waste gas from the $CO_2$ selective membrane unit permeate side; and
removing the $SO_2$ rich recycle from the $CO_2$ selective membrane unit retentate side.

12. The method of claim 11, further comprising the step of recycling the $CO_2$ waste gas to the $SO_2$ selective membrane unit retentate side, such that additional sulfur dioxide is recovered in the $SO_2$ rich recycle.

13. The method of claim 11, further comprising the step of recycling the $SO_2$ rich recycle to the sulfur removal unit, such that the introduction of the $SO_2$ rich recycle to the sulfur removal unit allows for additional sulfur recovery while assisting in maintaining a proper temperature profile in the sulfur removal unit due to the lower concentration of carbon dioxide in the $SO_2$ rich recycle, and further such that an amount of a fuel gas introduced to the sulfur removal unit is reduced.

14. The method of claim 13, further comprising the step of providing an air sweep to the $SO_2$ selective membrane unit permeate side, such that the $SO_2$ rich recycle provides an oxygen source to substitute a portion of air introduced to the sulfur removal unit.

15. The method of claim 1, wherein the $SO_2$ removal system comprises an $SO_2$ selective membrane unit, the $SO_2$ selective membrane unit comprising an $SO_2$ selective membrane unit retentate side and an $SO_2$ selective membrane unit permeate side, and the $CO_2$ removal system comprises a $CO_2$ selective membrane unit, the $CO_2$ selective membrane unit comprising a $CO_2$ selective membrane unit retentate side and a $CO_2$ selective membrane unit permeate side, and the $CO_2$ removal system further comprises a polishing $SO_2$ selective membrane unit, the polishing $SO_2$ selective membrane unit comprising a polishing $SO_2$ selective membrane unit retentate side and a polishing $SO_2$ selective membrane unit permeate side, and the method further comprising the steps of:
introducing the $SO_2$ emissions stream to the $SO_2$ selective membrane unit retentate side, the $SO_2$ selective membrane unit operable to allow sulfur dioxide to permeate the $SO_2$ selective membrane in preference to carbon dioxide;
causing sulfur dioxide to pass through the $SO_2$ selective membrane in the $SO_2$ selective membrane unit to produce the $CO_2$ removal system feed stream from the $SO_2$ selective membrane unit permeate side;
removing the low $SO_2$ discharge stream from the $SO_2$ selective membrane unit retentate side;
introducing the $CO_2$ removal system feed stream to the $CO_2$ selective membrane unit retentate side, the $CO_2$ selective membrane unit operable to allow carbon dioxide to permeate the $CO_2$ selective membrane in preference to sulfur dioxide;

causing carbon dioxide to pass through the $CO_2$ selective membrane in the $CO_2$ selective membrane unit to produce the $CO_2$ waste gas from the $CO_2$ selective membrane unit permeate side;

removing a $CO_2$ membrane retentate stream from the $CO_2$ selective membrane unit retentate side;

introducing the $CO_2$ membrane retentate stream to the polishing $SO_2$ selective membrane unit retentate side, the polishing $SO_2$ selective membrane unit operable to allow sulfur dioxide to permeate the $SO_2$ selective membrane in preference to carbon dioxide;

causing sulfur dioxide to pass through the $SO_2$ selective membrane in the polishing $SO_2$ selective membrane unit to produce the $SO_2$ rich recycle from the polishing $SO_2$ selective membrane unit permeate side; and removing a polishing $SO_2$ selective membrane retentate stream from the polishing $SO_2$ selective membrane unit retentate side.

16. The method of claim 15, further comprising the step of recycling the $CO_2$ waste gas to the $SO_2$ selective membrane unit retentate side, such that additional sulfur dioxide is recovered in the $SO_2$ rich recycle.

17. The method of claim 15, further comprising the step of recycling the polishing $SO_2$ selective membrane retentate stream to the $SO_2$ selective membrane unit retentate side, such that additional sulfur dioxide is recovered in the $SO_2$ rich recycle.

18. The method of claim 15, further comprising the step of recycling the $SO_2$ rich recycle to the sulfur removal unit, such that the introduction of the $SO_2$ rich recycle to the sulfur removal unit allows for additional sulfur recovery while assisting in maintaining a proper temperature profile in the sulfur removal unit due to the lower concentration of carbon dioxide in the $SO_2$ rich recycle, and further such that an amount of a fuel gas introduced to the sulfur removal unit is reduced.

19. The method of claim 18, further comprising the step of providing an air sweep to the $SO_2$ selective membrane unit permeate side, such that the $SO_2$ rich recycle provides an oxygen source to substitute a portion of air introduced to the sulfur removal unit.

20. The method of claim 1, wherein the $SO_2$ removal system comprises a first $SO_2$ selective membrane unit, the first $SO_2$ selective membrane unit comprising a first $SO_2$ selective membrane unit retentate side and a first $SO_2$ selective membrane unit permeate side, and the $SO_2$ removal system further comprises a second $SO_2$ selective membrane unit, the second $SO_2$ selective membrane unit comprising a second $SO_2$ selective membrane unit retentate side and a second $SO_2$ selective membrane unit permeate side, and further wherein the $CO_2$ removal system comprises a first $CO_2$ selective membrane unit, the first $CO_2$ selective membrane unit comprising a first $CO_2$ selective membrane unit retentate side and a first $CO_2$ selective membrane unit permeate side, and the $CO_2$ removal system further comprises a second $CO_2$ selective membrane unit, the second $CO_2$ selective membrane unit comprising a second $CO_2$ selective membrane unit retentate side and a second $CO_2$ selective membrane unit permeate side, the method further comprising the steps of:

introducing the $SO_2$ emissions stream to the first $SO_2$ selective membrane unit retentate side, the first $SO_2$ selective membrane unit operable to allow sulfur dioxide to permeate the $SO_2$ selective membrane in preference to carbon dioxide;

causing sulfur dioxide to pass through the $SO_2$ selective membrane in the first $SO_2$ selective membrane unit to produce the $CO_2$ removal system feed stream from the first $SO_2$ selective membrane unit permeate side;

removing an $SO_2$ membrane retentate stream from the first $SO_2$ selective membrane unit retentate side;

introducing the $SO_2$ membrane retentate stream to the second $SO_2$ selective membrane unit retentate side, the second $SO_2$ selective membrane unit operable to allow sulfur dioxide to permeate the $SO_2$ selective membrane in preference to carbon dioxide;

causing sulfur dioxide to pass through the $SO_2$ selective membrane in the second $SO_2$ selective membrane unit to produce an $SO_2$ membrane permeate stream from the second $SO_2$ selective membrane unit permeate side;

removing the low $SO_2$ discharge stream from the second $SO_2$ selective membrane unit retentate side;

introducing the $CO_2$ removal system feed stream to the first $CO_2$ selective membrane unit retentate side, the first $CO_2$ selective membrane unit operable to allow carbon dioxide to permeate the $CO_2$ selective membrane in preference to sulfur dioxide;

causing carbon dioxide to pass through the $CO_2$ selective membrane in the first $CO_2$ selective membrane unit to produce the $CO_2$ waste gas from the first $CO_2$ selective membrane unit permeate side;

removing a $CO_2$ membrane retentate stream from the first $CO_2$ selective membrane unit retentate side;

introducing the $CO_2$ membrane retentate stream to the second $CO_2$ selective membrane unit retentate side, the second $CO_2$ selective membrane unit operable to allow carbon dioxide to permeate the $CO_2$ selective membrane in preference to sulfur dioxide;

causing carbon dioxide to pass through the $CO_2$ selective membrane in the second $CO_2$ selective membrane unit to produce a $CO_2$ membrane permeate stream from the second $CO_2$ selective membrane unit permeate side; and removing the $SO_2$ rich recycle from the second $CO_2$ selective membrane unit retentate side.

21. The method of claim 20, further comprising the step of providing an air sweep to the second $SO_2$ selective membrane unit permeate side.

22. The method of claim 20, further comprising the step of recycling the $SO_2$ membrane permeate stream to the sulfur removal unit, wherein the carbon dioxide concentration of the $SO_2$ membrane permeate stream is lower than the concentration in the $SO_2$ emissions stream, such that the introduction of the $SO_2$ membrane permeate stream to the sulfur removal unit allows for additional sulfur recovery while assisting in maintaining a proper temperature profile in the sulfur removal unit due to the lower concentration of carbon dioxide in the $SO_2$ rich recycle, and further such that an amount of a fuel gas introduced to the sulfur removal unit is reduced.

23. The method of claim 20, further comprising the step of recycling the $SO_2$ rich recycle to the sulfur removal unit, such that the introduction of the $SO_2$ rich recycle to the sulfur removal unit allows for additional sulfur recovery while assisting in maintaining a proper temperature profile in the sulfur removal unit due to the lower concentration of carbon dioxide in the $SO_2$ rich recycle, and further such that an amount of a fuel gas introduced to the sulfur removal unit is reduced.

24. The method of claim 20, further comprising the step of recycling the $CO_2$ waste gas to the first $SO_2$ selective membrane unit retentate side, such that additional sulfur dioxide is recovered in the $SO_2$ rich recycle.

25. The method of claim 20, further comprising the step of recycling the $CO_2$ membrane permeate stream to the first $SO_2$ selective membrane unit retentate side, such that additional carbon dioxide is removed in the $CO_2$ waste gas, and further such that additional sulfur dioxide is recovered in the $SO_2$ rich recycle.

26. The method of claim 20, further comprising the step of recycling the $CO_2$ membrane permeate stream to the first $CO_2$ selective membrane unit retentate side, such that additional carbon dioxide is removed in the $CO_2$ waste gas, and further such that additional sulfur dioxide is recovered in the $SO_2$ rich recycle.

27. The method of claim 20, further comprising the step of recycling the $CO_2$ waste gas to the second $SO_2$ selective membrane unit retentate side, such that additional sulfur dioxide is recovered in the $SO_2$ rich recycle.

28. The method of claim 20, further comprising the step of recycling the low $SO_2$ discharge stream to the first $SO_2$ selective membrane unit permeate side, such that the low $SO_2$ discharge stream creates a gas sweep of the $SO_2$ selective membrane in the first $SO_2$ selective membrane unit permeate side.

29. The method of claim 1, wherein the $SO_2$ removal system comprises a first $SO_2$ selective membrane unit, the first $SO_2$ selective membrane unit comprising a first $SO_2$ selective membrane unit retentate side and a first $SO_2$ selective membrane unit permeate side, and the $SO_2$ removal system further comprises a second $SO_2$ selective membrane unit, the second $SO_2$ selective membrane unit comprising a second $SO_2$ selective membrane unit retentate side and a second $SO_2$ selective membrane unit permeate side, and further wherein the $CO_2$ removal system comprises a first $CO_2$ selective membrane unit, the first $CO_2$ selective membrane unit comprising a first $CO_2$ selective membrane unit retentate side and a first $CO_2$ selective membrane unit permeate side, and the $CO_2$ removal system further comprises a second $CO_2$ selective membrane unit, the second $CO_2$ selective membrane unit comprising a second $CO_2$ selective membrane unit retentate side and a second $CO_2$ selective membrane unit permeate side, and the $CO_2$ removal system further comprises a third $CO_2$ selective membrane unit, the third $CO_2$ selective membrane unit comprising a third $CO_2$ selective membrane unit retentate side and a third $CO_2$ selective membrane unit permeate side, the method further comprising the steps of:

introducing the $SO_2$ emissions stream to the first $SO_2$ selective membrane unit retentate side, the first $SO_2$ selective membrane unit operable to allow sulfur dioxide to permeate the $SO_2$ selective membrane in preference to carbon dioxide;

causing sulfur dioxide to pass through the $SO_2$ selective membrane in the first $SO_2$ selective membrane unit to produce the $CO_2$ removal system feed stream from the first $SO_2$ selective membrane unit permeate side;

removing an $SO_2$ membrane retentate stream from the first $SO_2$ selective membrane unit retentate side;

introducing the $SO_2$ membrane retentate stream to the second $SO_2$ selective membrane unit retentate side, the second $SO_2$ selective membrane unit operable to allow sulfur dioxide to permeate the $SO_2$ selective membrane in preference to carbon dioxide;

causing sulfur dioxide to pass through the $SO_2$ selective membrane in the second $SO_2$ selective membrane unit to produce an $SO_2$ membrane permeate stream from the second $SO_2$ selective membrane unit permeate side;

removing the low $SO_2$ discharge stream from the second $SO_2$ selective membrane unit retentate side;

introducing the $CO_2$ removal system feed stream to the first $CO_2$ selective membrane unit retentate side, the first $CO_2$ selective membrane unit operable to allow carbon dioxide to permeate the $CO_2$ selective membrane in preference to sulfur dioxide;

causing carbon dioxide to pass through the $CO_2$ selective membrane in the first $CO_2$ selective membrane unit to produce a first $CO_2$ membrane permeate stream from the first $CO_2$ selective membrane unit permeate side;

removing a first $CO_2$ membrane retentate stream from the first $CO_2$ selective membrane unit retentate side;

introducing the first $CO_2$ membrane retentate stream to the second $CO_2$ selective membrane unit retentate side, the second $CO_2$ selective membrane unit operable to allow carbon dioxide to permeate the $CO_2$ selective membrane in preference to sulfur dioxide;

causing carbon dioxide to pass through the $CO_2$ selective membrane in the second $CO_2$ selective membrane unit to produce a second $CO_2$ membrane permeate stream from the second $CO_2$ selective membrane unit permeate side;

removing the $SO_2$ rich recycle from the second $CO_2$ selective membrane unit retentate side;

introducing the first $CO_2$ membrane permeate stream to the third $CO_2$ selective membrane unit retentate side, the third $CO_2$ selective membrane unit operable to allow carbon dioxide to permeate the $CO_2$ selective membrane in preference to sulfur dioxide;

causing carbon dioxide to pass through the $CO_2$ selective membrane in the third $CO_2$ selective membrane unit to produce the $CO_2$ waste gas from the third $CO_2$ selective membrane unit permeate side; and removing a second $CO_2$ membrane retentate stream from the third $CO_2$ selective membrane unit retentate side.

30. The method of claim 29, further comprising the step of recycling the $SO_2$ rich recycle to the sulfur removal unit, such that the introduction of the $SO_2$ rich recycle to the sulfur removal unit allows for additional sulfur recovery while assisting in maintaining a proper temperature profile in the sulfur removal unit due to the lower concentration of carbon dioxide in the $SO_2$ rich recycle, and further such that an amount of a fuel gas introduced to the sulfur removal unit is reduced.

31. The method of claim 29, further comprising the step of providing an air sweep to the second $SO_2$ selective membrane unit permeate side.

32. The method of claim 29, further comprising the step of recycling the second $CO_2$ membrane retentate stream to the first $CO_2$ selective membrane unit retentate side, such that additional $CO_2$ is removed in the $CO_2$ waste gas, and further such that additional sulfur dioxide is recovered in the $SO_2$ rich recycle.

33. The method of claim 29, further comprising the step of recycling the second $CO_2$ membrane retentate stream to the first $CO_2$ selective membrane unit retentate side, such that such that additional carbon dioxide is removed in the $CO_2$ waste gas, and further such that additional sulfur dioxide is recovered in the $SO_2$ rich recycle.

34. The method of claim 1, wherein the $SO_2$ removal system comprises an $SO_2$ selective membrane unit, the $SO_2$ selective membrane unit comprising an $SO_2$ selective membrane unit retentate side and an $SO_2$ selective membrane unit permeate side, and the $CO_2$ removal system comprises a $CO_2$ selective membrane unit, the $CO_2$ selective membrane unit comprising a $CO_2$ selective membrane unit retentate side and a $CO_2$ selective membrane unit permeate side, and the method further comprising the steps of:

introducing the $SO_2$ emissions stream to the $SO_2$ selective membrane unit retentate side, the $SO_2$ selective membrane unit operable to allow sulfur dioxide to permeate the $SO_2$ selective membrane in preference to carbon dioxide;

generating vacuum pressure on the $SO_2$ selective membrane unit permeate side with an $SO_2$ selective membrane vacuum;

causing sulfur dioxide to pass through the $SO_2$ selective membrane in the $SO_2$ selective membrane unit to produce an $SO_2$ selective membrane permeate vacuum stream from the $SO_2$ selective membrane unit permeate side;

passing the $SO_2$ selective membrane permeate vacuum stream through the $SO_2$ selective membrane vacuum to generate the $CO_2$ removal system feed stream;

removing the low $SO_2$ discharge stream from the $SO_2$ selective membrane unit retentate side;

introducing the $CO_2$ removal system feed stream to the $CO_2$ selective membrane unit retentate side, the $CO_2$ selective membrane unit operable to allow carbon dioxide to permeate the $CO_2$ selective membrane in preference to sulfur dioxide;

generating vacuum pressure on the $CO_2$ selective membrane unit permeate side with a $CO_2$ selective membrane vacuum;

causing carbon dioxide to pass through the $CO_2$ selective membrane in the $CO_2$ selective membrane unit to produce a $CO_2$ selective membrane permeate vacuum stream from the $CO_2$ selective membrane unit permeate side;

passing the $CO_2$ selective membrane permeate vacuum stream through the $CO_2$ selective membrane vacuum to generate the $CO_2$ waste gas; and removing the $SO_2$ rich recycle from the $CO_2$ selective membrane unit retentate side.

35. The method of claim 1, wherein the $SO_2$ removal system comprises an $SO_2$ selective membrane unit, the $SO_2$ selective membrane unit comprising an $SO_2$ selective membrane unit retentate side and an $SO_2$ selective membrane unit permeate side, and the $CO_2$ removal system comprises a $CO_2$ selective membrane unit, the $CO_2$ selective membrane unit comprising a $CO_2$ selective membrane unit retentate side and a $CO_2$ selective membrane unit permeate side, and the $CO_2$ removal system further comprises a polishing $SO_2$ selective membrane unit, the polishing $SO_2$ selective membrane unit comprising a polishing $SO_2$ selective membrane unit retentate side and a polishing $SO_2$ selective membrane unit permeate side, and the method further comprising the steps of:

introducing the $SO_2$ emissions stream to the $SO_2$ selective membrane unit retentate side, the $SO_2$ selective membrane unit operable to allow sulfur dioxide to permeate the $SO_2$ selective membrane in preference to carbon dioxide;

generating vacuum pressure on the $SO_2$ selective membrane unit permeate side with an $SO_2$ selective membrane vacuum;

causing sulfur dioxide to pass through the $SO_2$ selective membrane in the $SO_2$ selective membrane unit to produce an $SO_2$ selective membrane permeate vacuum stream from the $SO_2$ selective membrane unit permeate side;

passing the $SO_2$ selective membrane permeate vacuum stream through the $SO_2$ selective membrane vacuum to generate the $CO_2$ removal system feed stream;

removing the low $SO_2$ discharge stream from the $SO_2$ selective membrane unit retentate side;

introducing the $CO_2$ removal system feed stream to the $CO_2$ selective membrane unit retentate side, the $CO_2$ selective membrane unit operable to allow carbon dioxide to permeate the $CO_2$ selective membrane in preference to sulfur dioxide;

generating vacuum pressure on the $CO_2$ selective membrane unit permeate side with a $CO_2$ selective membrane vacuum;

causing carbon dioxide to pass through the $CO_2$ selective membrane in the $CO_2$ selective membrane unit to produce a $CO_2$ selective membrane permeate vacuum stream from the $CO_2$ selective membrane unit permeate side;

passing the $CO_2$ selective membrane permeate vacuum stream through the $CO_2$ selective membrane vacuum to generate the $CO_2$ waste gas;

removing a $CO_2$ membrane retentate stream from the $CO_2$ selective membrane unit retentate side;

introducing the $CO_2$ membrane retentate stream to the polishing $SO_2$ selective membrane unit retentate side, the polishing $SO_2$ selective membrane unit operable to allow sulfur dioxide to permeate the $SO_2$ selective membrane in preference to carbon dioxide;

generating vacuum pressure on the polishing $SO_2$ selective membrane unit permeate side with a polishing $SO_2$ selective membrane vacuum;

causing sulfur dioxide to pass through the $SO_2$ selective membrane in the polishing $SO_2$ selective membrane unit to produce a polishing $SO_2$ selective membrane permeate vacuum stream from the polishing $SO_2$ selective membrane unit permeate side;

passing the polishing $SO_2$ selective membrane permeate vacuum stream through the polishing $SO_2$ selective membrane vacuum to generate the $SO_2$ rich recycle; and removing a polishing $SO_2$ selective membrane retentate stream from the polishing $SO_2$ selective membrane unit retentate side.

36. The method of claim 1, wherein the $SO_2$ removal system comprises a first $SO_2$ selective membrane unit, the first $SO_2$ selective membrane unit comprising a first $SO_2$ selective membrane unit retentate side and a first $SO_2$ selective membrane unit permeate side, and the $SO_2$ removal system further comprises a second $SO_2$ selective membrane unit, the second $SO_2$ selective membrane unit comprising a second $SO_2$ selective membrane unit retentate side and a second $SO_2$ selective membrane unit permeate side, and further wherein the $CO_2$ removal system comprises a first $CO_2$ selective membrane unit, the first $CO_2$ selective membrane unit comprising a first $CO_2$ selective membrane unit retentate side and a first $CO_2$ selective membrane unit permeate side, and the $CO_2$ removal system further comprises a second $CO_2$ selective membrane unit, the second $CO_2$ selective membrane unit comprising a second $CO_2$ selective membrane unit retentate side and a second $CO_2$ selective membrane unit permeate side, the method further comprising the steps of:

introducing the $SO_2$ emissions stream to the first $SO_2$ selective membrane unit retentate side, the first $SO_2$ selective membrane unit operable to allow sulfur dioxide to permeate the $SO_2$ selective membrane in preference to carbon dioxide;

generating vacuum pressure on the first $SO_2$ selective membrane unit permeate side with a first $SO_2$ selective membrane vacuum;
causing sulfur dioxide to pass through the $SO_2$ selective membrane in the first $SO_2$ selective membrane unit to produce a first $SO_2$ selective membrane permeate vacuum stream from the first $SO_2$ selective membrane unit permeate side;
passing the first $SO_2$ selective membrane permeate vacuum stream through the first $SO_2$ selective membrane vacuum to generate the $CO_2$ removal system feed stream;
removing an $SO_2$ membrane retentate stream from the first $SO_2$ selective membrane unit retentate side;
introducing the $SO_2$ membrane retentate stream to the second $SO_2$ selective membrane unit retentate side, the second $SO_2$ selective membrane unit operable to allow sulfur dioxide to permeate the $SO_2$ selective membrane in preference to carbon dioxide;
generating vacuum pressure on the second $SO_2$ selective membrane unit permeate side with a second $SO_2$ selective membrane vacuum;
causing sulfur dioxide to pass through the $SO_2$ selective membrane in the second $SO_2$ selective membrane unit to produce a second $SO_2$ selective membrane permeate vacuum stream from the second $SO_2$ selective membrane unit permeate side;
passing the second $SO_2$ selective membrane permeate vacuum stream through the second $SO_2$ selective membrane vacuum to generate an $SO_2$ membrane permeate stream;
removing the low $SO_2$ discharge stream from the second $SO_2$ selective membrane unit retentate side;
introducing the $CO_2$ removal system feed stream to the first $CO_2$ selective membrane unit retentate side, the first $CO_2$ selective membrane unit operable to allow carbon dioxide to permeate the $CO_2$ selective membrane in preference to sulfur dioxide;
generating vacuum pressure on the first $CO_2$ selective membrane unit permeate side with a first $CO_2$ selective membrane vacuum;
causing carbon dioxide to pass through the $CO_2$ selective membrane in the first $CO_2$ selective membrane unit to produce a first $CO_2$ selective membrane permeate vacuum stream from the first $CO_2$ selective membrane unit permeate side;
passing the first $CO_2$ selective membrane permeate vacuum stream through the first $CO_2$ selective membrane vacuum to generate the $CO_2$ waste gas;
removing a $CO_2$ membrane retentate stream from the first $CO_2$ selective membrane unit retentate side;
introducing the $CO_2$ membrane retentate stream to the second $CO_2$ selective membrane unit retentate side, the second $CO_2$ selective membrane unit operable to allow carbon dioxide to permeate the $CO_2$ selective membrane in preference to sulfur dioxide;
generating vacuum pressure on the second $CO_2$ selective membrane unit permeate side with a second $CO_2$ selective membrane vacuum;
causing carbon dioxide to pass through the $CO_2$ selective membrane in the second $CO_2$ selective membrane unit to produce a second $CO_2$ selective membrane permeate vacuum stream from the second $CO_2$ selective membrane unit permeate side;
passing the second $CO_2$ selective membrane permeate vacuum stream through the second $CO_2$ selective membrane vacuum to generate a $CO_2$ membrane permeate stream; and
removing the $SO_2$ rich recycle from the second $CO_2$ selective membrane unit retentate side.

37. The method of claim 1, wherein the $SO_2$ removal system comprises a first $SO_2$ selective membrane unit, the first $SO_2$ selective membrane unit comprising a first $SO_2$ selective membrane unit retentate side and a first $SO_2$ selective membrane unit permeate side, and the $SO_2$ removal system further comprises a second $SO_2$ selective membrane unit, the second $SO_2$ selective membrane unit comprising a second $SO_2$ selective membrane unit retentate side and a second $SO_2$ selective membrane unit permeate side, and further wherein the $CO_2$ removal system comprises a first $CO_2$ selective membrane unit, the first $CO_2$ selective membrane unit comprising a first $CO_2$ selective membrane unit retentate side and a first $CO_2$ selective membrane unit permeate side, and the $CO_2$ removal system further comprises a second $CO_2$ selective membrane unit, the second $CO_2$ selective membrane unit comprising a second $CO_2$ selective membrane unit retentate side and a second $CO_2$ selective membrane unit permeate side, and the $CO_2$ removal system further comprises a third $CO_2$ selective membrane unit, the third $CO_2$ selective membrane unit comprising a third $CO_2$ selective membrane unit retentate side and a third $CO_2$ selective membrane unit permeate side, the method further comprising the steps of:
introducing the $SO_2$ emissions stream to the first $SO_2$ selective membrane unit retentate side, the first $SO_2$ selective membrane unit operable to allow sulfur dioxide to permeate the $SO_2$ selective membrane in preference to carbon dioxide;
generating vacuum pressure on the first $SO_2$ selective membrane unit permeate side with a first $SO_2$ selective membrane vacuum;
causing sulfur dioxide to pass through the $SO_2$ selective membrane in the first $SO_2$ selective membrane unit to produce a first $SO_2$ selective membrane permeate vacuum stream from the first $SO_2$ selective membrane unit permeate side;
passing the first $SO_2$ selective membrane permeate vacuum stream through the first $SO_2$ selective membrane vacuum to generate the $CO_2$ removal system feed stream;
removing an $SO_2$ membrane retentate stream from the first $SO_2$ selective membrane unit retentate side;
introducing the $SO_2$ membrane retentate stream to the second $SO_2$ selective membrane unit retentate side, the second $SO_2$ selective membrane unit operable to allow sulfur dioxide to permeate the $SO_2$ selective membrane in preference to carbon dioxide;
generating vacuum pressure on the second $SO_2$ selective membrane unit permeate side with a second $SO_2$ selective membrane vacuum;
causing sulfur dioxide to pass through the $SO_2$ selective membrane in the second $SO_2$ selective membrane unit to produce a second $SO_2$ selective membrane permeate vacuum stream from the second $SO_2$ selective membrane unit permeate side;
passing the second $SO_2$ selective membrane permeate vacuum stream through the second $SO_2$ selective membrane vacuum to generate an $SO_2$ membrane permeate stream;
removing the low $SO_2$ discharge stream from the second $SO_2$ selective membrane unit retentate side;

introducing the $CO_2$ removal system feed stream to the first $CO_2$ selective membrane unit retentate side, the first $CO_2$ selective membrane unit operable to allow carbon dioxide to permeate the $CO_2$ selective membrane in preference to sulfur dioxide;

generating vacuum pressure on the first $CO_2$ selective membrane unit permeate side with a first $CO_2$ selective membrane vacuum;

causing carbon dioxide to pass through the $CO_2$ selective membrane in the first $CO_2$ selective membrane unit to produce a first $CO_2$ selective membrane permeate vacuum stream from the first $CO_2$ selective membrane unit permeate side;

passing the first $CO_2$ selective membrane permeate vacuum stream through the first $CO_2$ selective membrane vacuum to generate a first $CO_2$ membrane permeate stream;

removing a first $CO_2$ membrane retentate stream from the first $CO_2$ selective membrane unit retentate side;

introducing the first $CO_2$ membrane retentate stream to the second $CO_2$ selective membrane unit retentate side, the second $CO_2$ selective membrane unit operable to allow carbon dioxide to permeate the $CO_2$ selective membrane in preference to sulfur dioxide;

generating vacuum pressure on the second $CO_2$ selective membrane unit permeate side with a second $CO_2$ selective membrane vacuum;

causing carbon dioxide to pass through the $CO_2$ selective membrane in the second $CO_2$ selective membrane unit to produce a second $CO_2$ selective membrane permeate vacuum stream from the second $CO_2$ selective membrane unit permeate side;

passing the second $CO_2$ selective membrane permeate vacuum stream through the second $CO_2$ selective membrane vacuum to generate a second $CO_2$ membrane permeate stream;

removing the $SO_2$ rich recycle from the second $CO_2$ selective membrane unit retentate side;

introducing the first $CO_2$ membrane permeate stream to the third $CO_2$ selective membrane unit retentate side, the third $CO_2$ selective membrane unit operable to allow carbon dioxide to permeate the $CO_2$ selective membrane in preference to sulfur dioxide;

generating vacuum pressure on the third $CO_2$ selective membrane unit permeate side with a third $CO_2$ selective membrane vacuum;

causing carbon dioxide to pass through the $CO_2$ selective membrane in the third $CO_2$ selective membrane unit to produce a third $CO_2$ selective membrane permeate vacuum stream from the third $CO_2$ selective membrane unit permeate side;

passing the third $CO_2$ selective membrane permeate vacuum stream through the third $CO_2$ selective membrane vacuum to generate the $CO_2$ waste gas; and removing a second $CO_2$ membrane retentate stream from the third $CO_2$ selective membrane unit retentate side.

* * * * *